United States Patent [19]

Matsunaga et al.

[11] Patent Number: 5,391,665
[45] Date of Patent: Feb. 21, 1995

[54] PROCESS FOR PRODUCING POLYMER HAVING HYDROXYL GROUPS AT BOTH TERMINALS

[75] Inventors: Toshiaki Matsunaga; Kazuo Takei, both of Osaka; Taketo Toba, Hyogo; Hiroyuki Ikeuchi, Osaka; Fumihide Tamura, Shiga, all of Japan

[73] Assignee: Nippon Shokubai Co., Ltd., Osaka, Japan

[21] Appl. No.: 30,368

[22] PCT Filed: Aug. 4, 1992

[86] PCT No.: PCT/JP92/00992

§ 371 Date: Apr. 2, 1993

§ 102(e) Date: Apr. 2, 1993

[87] PCT Pub. No.: WO93/03066

PCT Pub. Date: Feb. 18, 1993

[30] Foreign Application Priority Data

Aug. 5, 1991 [JP] Japan .................. 3-195560
Jan. 21, 1992 [JP] Japan .................. 4-008767

[51] Int. Cl.$^6$ .............................................. C08F 2/38
[52] U.S. Cl. ................................. 526/211; 526/223; 526/84; 526/85; 526/317.1; 526/318.4; 526/318.44; 526/245; 526/279; 526/309; 526/328; 526/329.7; 526/262; 526/346
[58] Field of Search ................. 526/211, 223, 84, 85

[56] References Cited

U.S. PATENT DOCUMENTS

| | | | |
|---|---|---|---|
| 3,699,153 | 10/1972 | Siebert | 560/190 |
| 4,156,764 | 5/1979 | White | 526/211 |
| 4,207,238 | 6/1980 | Gilles | 548/519 |
| 4,238,397 | 12/1980 | Gilles | 548/519 |
| 4,306,048 | 12/1981 | Yoshida et al. | 526/193 |
| 4,910,274 | 3/1990 | Priddy | 526/210 |

FOREIGN PATENT DOCUMENTS

| | | |
|---|---|---|
| 46-3173 | 1/1971 | Japan . |
| 60-8689 | 3/1985 | Japan . |
| 54-47782 | 4/1986 | Japan . |
| 61-271306 | 12/1986 | Japan . |
| 4-202504 | 7/1992 | Japan . |
| 4-202508 | 7/1992 | Japan . |

OTHER PUBLICATIONS

Journal of Polymer Science: Part A-1, vol. 9, pp. 2029-2038 (1971).
Trans. Faraday Soc., vol. 55, pp. 1451-1460, (1960).
Journal of Polymer Science: Part A-1, vol. 9, pp. 2147-2153 (1971).

Primary Examiner—Mark Nagumo
Attorney, Agent, or Firm—Armstrong, Westerman, Hattori, McLeland & Naughton

[57] ABSTRACT

There are provided a process for obtaining a polymer having hydroxyl groups at both terminals easily and with cheap cost and excellent efficiency from a wide variety of vinyl-based compounds, a composition containing said polymer and its use, and a polymer derived from said composition and its use.

The polymerization reaction of a vinyl-based monomer (b) is carried out by using a radical polymerization initiator (c) in the presence of a compound (a) represented by the general formula:

$$HO-A-(S)_x-B-OH \quad (I)$$

and, a polymer having hydroxyl groups at both terminals is obtained under conditions that, in the above reaction, any compound other than (a), (b) and (c) is not practically used and the compound (a) always exists in 50 mole times or more of the initiator (c) in the course of reaction in a reactor; and either a composition containing this polymer or a polymer derived from this composition is used.

6 Claims, No Drawings

PROCESS FOR PRODUCING POLYMER HAVING HYDROXYL GROUPS AT BOTH TERMINALS

TECHNICAL FIELD

The present invention relates to a process for producing a useful polymer having hydroxyl groups at both terminals capable of reacting with various kinds of functional groups, a composition containing the polymer and its use, and a polymer derived from the composition and its use.

BACKGROUND ART

A polymer having hydroxyl groups at both terminals is able to convert easily the hydroxyl groups into other functional groups by carrying out a suitable reaction on the groups and also, the polymer itself converts into a linear molecule and/or a network molecule by using reactivity of the terminal hydroxyl groups and carrying out a suitable reaction on these hydroxyl groups and, as a result, the polymer becomes a high-molecular compound having excellence in various properties such as strength, heat resistance, weather resistance, durability and so forth.

This polymer having hydroxyl groups at both terminals has, for example, the undermentioned great advantage by displaying a feature such as having the hydroxyl groups at both terminals.

In the case where the polymer is used as various kinds of resin materials such as a polyester resin, polyurethane resin, polycarbonate resin and the like, there is not any unreacted material which may damage material properties, and all polymers are surely assembled in a resin-crosslinked structure.

A polymer which a functional group was introduced into the side chain by copolymerizing a vinyl-based monomer having a functional group such as a hydroxyl group, carboxyl group, an and the like (hereinafter, referred to as "a copolymer of a functional group-containing vinyl-based monomer"); when said polymer was used for a reaction, the terminals become a play part (a free terminal) which is not assembled in the resin (crosslinked) structure, but such a thing does not occur in a polymer having hydroxyl groups at both terminals.

Compared with the copolymer of a functional group-containing vinyl-based monomer, because scattering in the distances among the functional groups is very small, the distances among reacting sites (crosslinking sites) are nearly constant, so that a homogeneous resin (crosslinked) structure is made.

In the case of a copolymer of a functional group-containing vinyl-based monomer, even if the synthesis of a thermoplastic polymer is attempted by making a material of 2.0 in average functional group number and by allowing this to react with a chain-elongating agent having two functionalities, since a polymer having three or more functionalities is statistically included because of a reason originated from the synthetic process, a thermosetting polymer is obtained as the major part, and a thermoplastic polymer can not be synthesized. However, in the case of a polymer having hydroxyl groups at both terminals, and not containing a polymer having three or more functionalities, a thermoplastic polymer, of which chain has been elongated, can be easily synthesized.

The polymer having hydroxyl groups at both terminals, by taking the above-described advantage, is very useful as raw materials for various resins such as a polyester resin, polyurethane resin, polycarbonate resin and the like, and further, as raw materials for coating, tacky and non-tacky adhesive, a sealing compound, urethane foam, a gel court material, thermoplastic elastomer, molding material, resin modifier (a material to afford impact resistance), vibration-controlling material, an elastic wall material, a floor material, fiber-processing material, an UV.EB curing resin, a reactive diluent used for high solid coating, etc. and so forth. In addition, the polymer is useful as various kinds of resin additives and their raw materials.

Preferable examples of the polymer having hydroxyl groups used as raw materials for coating, a tacky and nontacky adhesive, urethane foam, a sealing compound, a gel court material, thermoplastic elastomer, various kinds of molding materials, a resin modifier (a material to afford impact resistance), vibration-controlling material, an elastic wall material, a floor material, fiber-processing material, an UV.EB curing resin, a reactive diluent used for high solid coating, etc. and so forth: those are a copolymer of a vinyl-based monomer having hydroxyl groups on its side chain as well as a polyether, polyester, polybutadiene and polycarbonate having hydroxyl groups at terminals and the like. However, those polymers have the undermentioned problems. At first, since a copolymer of a vinyl-based monomer having hydroxyl groups on its side chain is prepared by a random type radical polymerization reaction between a vinyl-based monomer having the hydroxyl group and a vinyl-based monomer having no hydroxyl group, by-product formation of a copolymer having no hydroxyl group is difficult to suppress and, in order to avoid this formation, it is necessary to increase the hydroxyl group content in the copolymer and also, there was found scattering in the number of hydroxyl groups contained in one molecule. Because of this, in a case where a reaction was carried out between the copolymer of a vinyl-based monomer having hydroxyl groups on its side chain and a polyfunctional compound capable of reacting with the hydroxyl groups, a polymer showing sufficient stretching (processing performance for bending is excellent) and strongness is not obtained by reasons of remaining unreacted copolymer and large scattering in distances among reaction sites, and by that a play chain part which does not directly participate in the structure of a crosslinked polymer obtained after reaction is formed and a hydroxyl group not participating in the reaction remains.

Next, a polyether, polyester, polybutadiene and the like having hydroxyl groups at terminals, because they have the hydroxyl groups at terminals, have a little defect that a copolymer of a vinyl-based monomer having hydroxyl groups on its side chain has. However, in the case of polyethers because of the ether bond on the main chain, in the case of polyesters because of the ester bond on the main chain, and in the case of polybutadiens because of the unsaturated double bond on the main chain, these polymers have defects such as badness in weather resistance, water resistance and heat resistance.

As described above, at present, in a polymer having hydroxyl groups, which is used as raw materials for coating, a tacky and non-tacky adhesive, urethane foam, a sealing compound, gel court material, thermoplastic elastomer, various kinds of molding materials, a resin modifier (a material to afford impact resistance), vibration-controlling material, an elastic wall material, a floor material, fiber-processing material, an UV.EB curing resin, a reactive diluent used for high solid coating, etc. and so forth; there is not found any member satisfactory for all demands and capabilities such as strongness, stretching (processing performance for bending), weather resistance, water resistance and so forth.

Although it is considered that a problem of this sort may be solved by a vinyl-based polymer having hydroxyl groups at both terminals, as mentioned below, the real situation is that any process for producing industrially a polymer having hydroxyl groups at both terminals from a wide range of vinyl-based monomers involving polar vinyl-based monomers such as acrylic acid, acrylate, methacrylic acid, methacrylate and the like has not been established.

An example of a process for producing a vinyl-based polymer having hydroxyl groups at terminals is a process such as introducing one hydroxyl group into one terminal of the polymer by using, for example, 2-mercaptoethanol and the like as a chain-transfer agent and introducing another one (as an average) hydroxyl group into a polymer molecule by copolymerizing with 2-hydroxyethyl methacrylate and the like.

However, in this process, al though two hydroxyl groups per one molecule of a polymer are introduced as average, only one of the two hydroxyl groups is introduced into one terminal of the polymer and another hydroxyl group is introduced into the middle of a main chain, but not into the terminal. Furthermore, since another hydroxyl group is introduced by a copolymerization reaction, the to total number of hydroxyl groups per one molecule of the polymer is in a scatter distribution such as being from one to three or more, and a wide distribution is seen in the distances among hydroxyl groups. Accordingly, an obtained polymer can not almost display any merit which the polymer having hydroxyl groups at both terminals has. Furthermore, by adding a mercaptan compound, there were problems that the polymerization reaction became extremely slow, the polymerization degree did not raise, and the smell of residual mercaptan remained.

Other examples of a process for producing a vinyl-based polymer having hydroxyl groups at both terminals are, as shown in the undermentioned (i) to (iii), processes of carrying out radical polymerization reactions of vinyl-based monomers in the presence of various kinds of initiators and chain-transfer agents.

(i) A process for producing a polymer having hydroxyl groups at both terminals by polymerizing styrene or butadiene by using an initiator having the hydroxyl group. Refer to Journal of Polymer Science, Part A1, Volume 9, p. 2029 (1971).

(ii) A process for producing a polymer having hydroxyl groups at both terminals, comprising a thermal polymerization reaction or a photopolymerization reaction carried out by using a dithiocarbamate or thiuram disulfide having the hydroxyl group as an initiator, or comprising a polymerization reaction carried out by using the dithiocarbamate or thiuram disulfide as a chain transfer agent and using hydrogen peroxide as an initiator. Refer to Japanese Official Patent Provisional Publication, showa 61-271306.

(iii) A process for producing a polymer having hydroxyl groups at both terminals, comprising a polymerization reaction carried out by using a disulfide or trisulfide having hydroxyl groups at both terminals as a chain transfer agent. Refer to Japanese Official Patent Provisional Publication, showa 54-47782.

However, the aforementioned, conventional processes for producing a polymer having hydroxyl groups at both terminals (i) to (iii) have respective defects, as mentioned below, and it is not easy to synthesize a polymer having hydroxyl groups at both terminals surely, with a cheap price, simply and industrially, from many kinds of vinyl-based monomers.

At first, in Process (i), there was a problem that usable vinyl-based monomers were limited to butadienes and styrenes, and polar vinyl-based monomers such as acrylates and methacrylates could not be used.

In the aforementioned process (ii), there was a problem that the thiuram disulfide having a functional group such as a hydroxyl group is unstable and, thereby, its treating was difficult and also, a produced polymer was colored in yellow.

Finally, in the aforementioned process (iii), there is a problem that, because attention to the ratio of a chain-transfer agent to an initiator is not paid, in a case where the chain-transfer agent is not sufficiently in excess compared with the amount of an initiator, a flake of the initiator is introduced into the terminals of a polymer and a polymer having the hydroxyl group at only one terminal is formed as a by-product and, therefore, a polymer having the terminal hydroxyl groups in a low number is formed.

As described above, at the present time there has not been established any process for producing industrially a polymer having hydroxyl groups at both terminals from a wide field of vinyl-based monomers including polar vinyl-based monomers such as acrylic acid, acrylate, methacrylic acid, methacrylate and the like.

Under these circumstances, it is an object of the present invention to provide a process for obtaining a polymer having hydroxyl groups at both terminals easily, with a cheap price and good efficiency, from a wide field of vinyl-based monomers including polar vinyl-based monomers such as acrylic acid, acrylate, methacrylic acid, methacrylate and the like, a composition containing this polymer and showing superiority in strongness, weather resistance, water resistance and so forth, and its use, and a polymer derived from the composition and its use.

DISCLOSURE INVENTION

To solve the above object, the process for producing a polymer having hydroxyl groups at both terminals relating to the present invention, characterized in that, in a process of carrying out a polymerization reaction of a vinyl-based monomer (b) using a radical polymerization initiator (c) in the presence of a compound (a) represented by the following general formula (I), the compound (a) is arranged so as to exist always in an amount of 50 mole times or more of the radical polymerization initiator (c) in a reactor during the reaction and, without using any reagent other than the compound (a), vinyl-based monomer (b) and radical polymerization initiator (c) practically, the polymerization reaction is carried out.

$$HO-A-(S)_x-B-OH \qquad (I)$$

(In the formula, A and B respectively denote a two-valent organic group and is an integer of from 2 to 5.)

The composition relating to the present invention is such as containing a polymer having hydroxyl groups at both terminals obtained from the aforementioned production process of this invention and a compound (d) having, in one molecule, two or more of a functional group capable of reacting with the hydroxyl group as essential components.

A polymer having polymerizable unsaturated groups at both terminals relating to the present invention is obtained by allowing a polymer having hydroxyl groups at both terminals, obtained from the aforementioned production process of this invention, to react with a compound (h) having two kinds of reactive groups in one molecule, that are a functional group capable of reacting with the hydroxyl group and a polymerizable unsaturated group.

A polymer having carboxyl groups at both terminals relating to the present invention is obtained by allowing a polymer having hydroxyl groups at both terminals, obtained from the aforementioned production process of this invention, to react with a compound (j) having two kinds of reactive groups in one molecule, that are a functional group capable of reacting with the hydroxyl group and a carboxyl group, and/or with an acid anhydride.

A polyurethane relating to the present invention (hereinafter, this compound is simply referred to as "polyurethane of this invention") is obtained by allowing a polyol component (1) containing, as an essential component, a polymer having hydroxyl groups at both terminals, obtained from the aforementioned production process of this invention, to react with a polyfunctional isocyanate compound (e) having two or more of an isocyanate group in one molecule.

A block polymer relating to the present invention is characterized by containing, as an essential component, a polymer having hydroxyl groups at both terminals, obtained from the aforementioned production process of this invention.

Hereinafter, a process for producing a polymer having hydroxyl groups at both terminals relating to the present invention is explained.

Practical examples of the compound (a) represented by the above-described general formula (I) are not especially limited, but preferable ones are, for example, as follows: hydroxyalkyldi(tri, tetra, or penta)sulfides such as bis(hydroxymethyl)disulfide, bis(hydroxymethyl)trisulfide, bis(hydroxymethyl) tetrasulfide, bis(hydroxymethyl)pentasulfide, bis(2-hydroxyethyl)disulfide, bis(2-hydroxyethyl)trisulfide, bis(2-hydroxyethyl)tetrasulfide, bis(2-hydroxyethyl)pentasulfide, bis(3-hydroxypropyl)disulfide, bis(3-hydroxypropyl)trisulfide, bis(3-hydroxypropyl)tetrasulfide, bis(2-hydroxypropyl)disulfide, bis(2-hydroxypropyl)trisulfide, bis(2-hydroxypropyl)tetrasulfide, bis(4-hydroxybutyl)disulfide, bis(4-hydroxybutyl) trisulfide, bis(4-hydroxybutyl)tetrasulfide, bis(8-hydroxyoctyl)disulfide, bis(8-hydroxyoctyl)trisulfide, bis(8-hydroxyoctyl)tetrasulfide and the like, and ethylene oxide or propylene oxide adducts of the aforementioned hydroxyalkyldi(tri, tetra, or penta)sulfides; di (2-hydroxyethyl)esters (ethylene oxide adducts) or di(hydroxypropyl)esters (propylene oxide adducts) or the like of di(tri or tetra)sulfidodicarboxylic acids such as 2,2'-dithiodiglycolic acid, 2,2'-trithiodiglycolic acid, 2,2'-tetrathiodiglycolic acid, 3,3'-dithiodipropionic acid, 3,3'-trithiodipropionic acid, 3,3'-tetrathiodipropionic acid, 3,3'-pentathiodipropionic acid, 4,4'-dithiodibutanoic acid,, 4'-trithiodibutanoic acid, 4,4'-tetrathiodibutanoic acid, 8,8'-dithiodioctanoic acid, 8,8'-trithiodioctanoic acid, 8,8'-tetrathiodioctanoic acid, 2,2'-dithiodibenzoic acid, 2,2'-trithiodibenzoic acid, 2,2'-tetrathiodibenzoic acid, 2,2'-dithiodinicotinic acid, 2,2'-trithiodinicotinic acid, 2,2'-tetrathiodinicotinic acid and the like. These compounds can be used alone or in combination of two or more kinds.

Next, the vinyl-based monomer (b) used in this invention is not especially limited as far as it is a vinyl-based monomer hitherto known in public, but preferable ones are, for example, (meth)acrylic acid-based monomers comprising (meth)acrylic acid; alkyl(meth)acrylates such as methyl(meth)acrylate, ethyl(meth)acrylate, butyl(meth)acrylate, cyclohexyl(meth)acrylate, 2-ethylhexyl(meth)acrylate, n-octyl(meth)acrylate, dodecyl(meth)acrylate, stearyl(meth)acrylate and the like; aryl(meth)acrylates such as benzyl(meth)acrylate and the like; substituted alkyl(meth)acrylates such as 2-hydroxyethy(meth)acrylate, hydroxypropyl(meth)acrylate, glycidyl(meth)acrylate, 2-aminoethyl(meth)acrylate, γ-(methacryloyloxypropyl)trimethoxysilane and the like; (meth)acrylic acid derivatives such as methoxyethyl(meth)acrylate, a (meth)acrylic acid-ethylene oxide adduct and the like; perfluoroalkyl(meth)acrylates such as trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate and the like. Further preferable ones are aromatic vinyl-based monomers such as styrene, vinyl toluene, α-methylstyrene, chlorostyrene, styrenesulfonic acid and its sodium salt; fluorine-containing vinyl-based monomers such as perfluoromethyl (meth)acrylate, trifluoromethylmethyl(meth)acrylate, 2-trifluoromethylethyl(meth)acrylate, diperfluoromethylmethyl (meth)acrylate, 2-perfluoroethylethyl(meth)acrylate, 2-perfluoromethyl-2-perfluoroethylmethyl(meth)acrylate, triperfluoromethylmethyl(meth)acrylate, 2-perfluoroethyl-2-perfluorobutylethyl(meth)acrylate, 2-perfluorohexylethyl(meth)acrylate, 2-perfluorodecylethyl (meth)acrylate, 2-perfluorohexadecylethyl(meth)acrylate, perfluroethylene, perfluropropylene, fluorinated vinylidene and the like; silicon-containing vinyl-based monomers such as vinyltrimethoxysilane, vinyltriethoxysilane, γ-(methacryloyloxypropyl)trimethoxysilane and the like; maleic anhydride, maleic acid, and monoalkyl and dialkyl esters of maleic acid; fumaric acid, and monoalkyl and dialkyl esters of fumaric acid; maleimide derivatives such as maleimide, methylmaleimide, ethylmaleimide, propylmaleimide, butylmaleimide, octylmaleimide, dodecylmaleimide, stearylmaleimide, phenylmaleimide, cyclohexylmaleimide and the like; nitrile group-containing vinyl-based monomers such as acrylonitrile, methacrylonitrile and the like; amide group-containing vinyl-based monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; dienes such as butadiene, isoprene and the like; vinyl chloride, vinylidene chloride, allyl chloride, allyl alcohol and the like. These compounds may be used as one kind or in combination of a plural kind.

As seen above, the vinyl-based monomer (b) used in this invention may include a case having a functional group such as a hydroxyl group, carboxyl group, an amino group and the like.

In a case where a relatively high crosslinking density is required, for example, in the coating use and the like, it is preferable that some amounts of a vinyl-based monomer having a functional group is jointly used. An amount for use of the vinyl-based monomer having a functional group is not especially limited, but, for example, in the case of a vinyl-based monomer having a hydroxyl group, it is preferred that the vinyl-based monomer having a hydroxyl group is in amount of 1 to 50% by weight to a total amount of the using vinyl-based monomers (b), and more preferred that it is in amount of 5 to 30% by weight. Also, in the case of a vinyl-based monomer having a carboxyl group, it is preferred that the vinyl-based monomer having a carboxyl group is in amount of 0.5 to 25% by weight to a total amount of the using vinyl-based monomers (b), and more preferred that it is in amount of 1 to 10% by weight.

The vinyl-based monomer (b), as mentioned above, is not especially limited as far as it is a vinyl-based monomer hitherto known in public, but in a case where the transparency, weather resistance, water resistance and so forth are required, it is preferable that a (meth)acrylic acid-based monomer is a main component. In this case, it is preferred that the (meth)acrylic acid-based monomer is contained in amount of 40% or more by weight to a total amount of the vinyl-based monomers (b).

Also, in a case where luster and hardness and so forth of a paint film are required, it is preferred to use an aromatic vinyl-based monomer. In this case, it is preferable that the aromatic vinyl-based monomer is contained in amount of 40% or more by weight to a total amount of the vinyl-based monomers (b).

Furthermore, in a case where water-repelling and oil-repelling performance and pollution-preventive performance and so forth are required, it is preferred to use a fluorine-containing vinyl-based monomer. In this case, it is preferable that the fluorine-containing vinyl-based monomer is contained in amount of 10% or more by weight to a total amount of the vinyl-based monomers (b).

Still further, in a case where adhesive performance with an inorganic material and pollution-preventive performance and so forth are required, it is preferred to use a silicon-containing vinyl-based monomer. In this case, it is preferable that the silicon-containing vinyl-based monomer is contained in amount of 10% or more by eight to a total amount of the vinyl-based monomers (b).

The radical polymerization initiator used in this invention is not especially limited, however, its preferable examples are, for example, organic peroxides such as isobutylyl peroxide, cumylperoxy neodecanoate, diisopropyloxy dicarbonate, di (n-propyl)peroxy dicarbonate, di(2-ethoxyethyl)peroxy dicarbonate, di(2-ethylhexyl)peroxy dicarbonate, tertiary-hexylperoxy neodecanoate, tertiary-butylperoxy neodecanoate, tertiary-hexylperoxy pivalate, tertiary-butylperoxy pivalate, 3,3,5-trimethylhexanoyl peroxide, decanoyl peroxide, lauroyl peroxide, cumylperoxy octate, succinyl peroxide, acetyl peroxide, tertiary-butylperoxy 2-ethylhexanate, m-toluoyl peroxide, benzoyl peroxide, tertiary-butylperoxy isobutylate, 1,1'-bis(tertiary-butylperoxy)-cyclohexane, tertiary-butylperoxy maleate, tertiary-butylperoxy laurate, cyclohexanone peroxide, tertiary-butylperoxyisopropyl carbonate, 2,5-dimethyl-2,5-di(-benzoylperoxy)hexane, tertiary-butylperoxy acetate, 2,2'-bis(tertiary-butylperoxy)butane, tertiary-butylperoxy benzoate, n-butyl-4,4'-bis(tertiary-butylperoxy)-valerate, di(tertiary-butylperoxy)isophthalate, methyl ethyl ketone peroxide, dicumyl peroxide, 2,5-dimethyl-2,5-di(tertiary-butylperoxy)hexane, $\alpha,\alpha$-bis(tertiary-butylperoxy-m-isopropyl)benzene, tertiary-butylcumyl peroxide, diisobutylbenzene hydroperoxide, di-tertiary-butyl peroxide, p-menthane hydroperoxide, 2,5-dimethyl-2,5-di(tertiary-butylperoxy)hexyne-3,1,1,3,3- tetramethylbutyl hydroperoxide, cumene hydroperoxide, tertiary-butyl hydroperoxide and the like; inorganic peroxides such as hydrogen peroxide, potassium persulfate, sodium persulfate, ammonium persulfate and the like; azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobis (isobutyronitrile), 2,2'-azobis(2-methylbutyronitrile), 1,1'-azobis(cyclohexane-1-carbonitrile), 2-(carbamoylazo)isobutyronitrile, 2-phenylazo-4-methoxy-2,4-dimethylvaleronitrile, 2,2'-azobis(2-amidino-propane)dihydrochloride, 2,2'-azobis(N,N'-dimethyleneisobutylamidine), 2,2'-azobis[2-methyl-N-(2-hydroxyethyl)-propionamide], 2,2'-azobis-(isobutylamide)dihydrate, 4,4'-azobis(4-cyanopentyl acid), 2,2'-azobis)2-cyanopropanol) and the like; redox system type initiators such as a hydrogen peroxide-Fe(II) salt, persulfate-sodium hydrogen sulfite, cumene hydroperoxide-Fe(II) salt, benzoyl peroxide-dimethylaniline and the like; and, as others, photosentitizers such as diacetyl, dibenzyl, acetophenone and the like. One kind among the above compounds may be used alone, or two or more kinds in combination may be used.

Meanwhile, the majority of initiators having various kinds of functional groups, for example, a hydroxyl group, an amino group, a carboxyl group and the like have high hydrophilicity and do not dissolve in vinyl-based monomers, most of which are lipophilic. However, since the initiators not having various kinds of functional groups are mostly lipophilic and easily soluble in various vinyl-based monomers, they are preferably used.

In the production process of this invention, because the mole ratio between the compound (a) and the radical polymerization initiator (c)[(a)/(c)] in a reactor in the course of reaction must be maintained at 50 or more, preferably at 60 or more, and the most preferable ratio is 100 or more.

In the production process of this invention, any ingredient other than the compound (a), vinyl-based monomer (b) and radical polymerization initiator (c) should not practically be used in the course of polymerization. In practice, the ingredient other than the compound (a), vinyl-based monomer (b) and radical polymerization initiator (c) is adjusted in about 10% by weight or less of the total amount. A preferable amount of the ingredient other than (a), (b) and (c) is 5% by weight or less and the most preferable is no use at all.

In the course of polymerization in the production process of this invention, as far as the mole ratio between the compound (a) and the radical polymerization initiator (c)[(a)/(c)] in a reactor is always at 50 or more during polymerization, any kind of polymerization process may be employed. For example, the polymerization reaction may be carried out by charging the compound (a), vinyl-based monomer (b) and radical polymerization initiator (c) at the beginning of reaction in one lot, or by feeding each ingredient in the polymerization system at any time. Further, the polymerization may be carried out by a process which comprises charging at least one part of necessary amounts of the compound (a) in a polymerization vessel and, to this, feeding the vinyl-based monomer (b), and radical polymerization initiator (c), on a certain occasion, with a residual amount of the compound (a). Meanwhile, on this occasion, judging from operation easiness, because feeding the radical polymerization initiator (c) as a solution of the vinyl-based monomer (b) is preferable, it is favored to use such an initiator (c) as sufficiently soluble in the vinyl-based monomer (b). In a case where the initiator (c) is hard to dissolve in the vinyl-based monomer (b), solvent may be jointly used as far as it does not disturb the object of this invention. Also, on this occasion, if the vinyl-based monomer (b) and radical polymerization initiator (c) are continuously fed into the compound (a), the polymerization reaction becomes mild and its controlling becomes very easy. Feeding of the vinyl-based monomer (b) and radical polymerization initiator (c) into the compound (a) may be intermittently.

In the production process of this invention, the amount ratio between the using compound (a) and the vinyl-based monomer (b) is not especially limited, and it is preferred to use the compound (a) in an amount larger than that of the vinyl-based monomer (b) in order to prevent the reduction of the terminal hydroxyl group number Fn(OH) per one molecule of a polymer; in which the reduction is caused by a side reaction occurring with that a radical formed from the initiator (c) does not undergo chain-transfer to the compound (a), but adds directly to the vinyl-based monomer (b) to initiate a polymerization reaction. Further practically, a preferable weight ratio between the compound (a) and the vinyl-based monomer (b) [compound (a)/vinyl-based monomer (b)] is 0.5 or more, and a more preferable one is 1.0 or more.

The reactor for polymerization used in this invention may be a batch type such as a flask type and kneader. Also, a piston-flow tube type and, depending upon the viscosity of a polymer, a continuous type such as a double shaft extruder and continuous type kneader may be used. Also, a semi-batch type reactor can be used with no problem at all, however, a tube type reactor, an extruder and a continuous type kneader are preferably used from standpoints that the concentration ratio of each additive in a reactor is easily controlled by adding each additive into the way of a tube, the residence time is constant, and the productive efficiency is excellent. Concerning proper use of the tube type reactor, extruder and continuous type kneader, the tube type reactor is preferably used for such as having low viscosity after a polymerization reaction, and the extruder and continuous type kneader for such as having relatively high viscosity.

Structure of the tube type reactor has no special limitation, and any tube type reactor hitherto-known in public such as a mixer of a single tube type and multi-tube type, a mixer of no mobile (made by Noritake Co., Ltd. and Sumitomo Sulzer Co., Ltd.) and the like can be used, however, it is preferable to use a tube type reactor in which a mixer of no mobile is used, from standpoints of mixing and heat exchange efficiency. Similarly, concerning the extruder and continuous kneader, any extruder hitherto-known in public of a single shaft type and double shaft type can be used, however, an extruder of a double shaft type and a continuous kneader are preferably used from standpoints of mixing and heat exchange efficiency.

Polymerization temperature of the production process of this invention has no special limitation and there is no problem at all when the temperature is in a range of about from room temperature to 200° C., in which an usual radical polymerization reaction is performed.

It is possible to perform the reaction under pressure in an autoclave or an extruder.

The average molecular weight of a polymer having hydroxyl groups at both terminals produced by the present invention is not especially limited, however, it is preferable that the number-average molecular weight is in a range of from 500 to 100,000 in order to display the feature resulting from having the reactive hydroxyl groups at both terminals, and it is more preferable that the molecular weight is in a range of from 1,000 to 10,000.

Concerning the average number of terminal hydroxyl groups (Fn(OH)) of a polymer having hydroxyl groups at both terminals produced by the present invention, it is ideally 2.0, however, if it is in a range of from 1.8 to 2.0, properties similar to almost ideal ones can be displayed, so that this average number is very preferable. If the average number is at least 1.5, properties close to fairly ideal ones can be displayed. Because of this reason, it is enough that the average number of terminal hydroxyl groups (Fn(OH)) of a polymer aimed in this invention is 1.5 or more.

The polymer having hydroxyl groups at both terminals produced by the present invention is able to convert the hydroxyl groups, by using an organic reaction hitherto-known in public, into an useful terminal functional group such as a polymerizable unsaturated group such as a vinyl group, an amino group, a carboxyl group, an ethynyl group, epoxy group, silanol group, an alkoxysilyl group, a hydrosilyl group, mercapto group, an oxazoline group, a maleimide group, an azlactone group, a lactone group, bromine, chlorine and the like.

Next, the composition relating to the present invention is explained.

The composition of this invention, as mentioned above, contains a polymer having hydroxyl groups at both terminals produced by the production process of this invention as well as the compound (d) having two or more of a functional group capable of reacting with the hydroxyl group per one molecule as essential components. The polymer having hydroxyl groups at both terminals may be used in one kind or in combination of two or more kinds. Also, the weight ratio between the polymer having hydroxyl groups at both terminals and the compound (d) [polymer having hydroxyl groups at both terminals/compound (d)] contained in this composition is not especially limited, but a preferable ratio is in a range of from 99.99/0.01 to 40/60 and a more preferable one is in a range of from 99.9/0.1 to 60/40.

The composition of this invention, in addition to the polymer having hydroxyl groups at both terminals produced by the production process of this invention, may contain a low molecular weight compound having a hydroxyl group hitherto-known in public and a polymer having a hydroxyl group hitherto-known in public (an acryl polyol, a polyether polyol, polyester polyol, polycarbonate polyol, polybutadiene polyol, polyolefine polyol and the like).

The compound (d) having two or more of a functional group capable of reacting with a hydroxyl group per one molecule is not especially limited and its preferable examples are a compound (e) having two or more of an isocyanate group per one molecule, an amino plastoresin (f) such as methylolated melamines, its alkyl ether derivatives and low-condensation compounds (the expression "a low-condensation compound" used herein is employed to mean "a compound made by comprising several, not many repeat of condensation reactions"), and a compound (g) having two or more of a carboxyl group per one molecule such as a polyfunctional carboxylic acid, its halogenides and the like, as well as the like.

The compound (e) having two or more of an isocyanate group per one molecule is a so-called polyfunctional isocyanate compound. All of the polyfunctional isocyanate compounds hitherto-known in public can be used here. Preferable compounds are, for example, isocyanate compounds such as tolylene diisocyanate, diphenylmethane 4,4'-diisocyanate, hexamethylene diisocyanate, xylylene diisocyanate, m-xylylene diisocyanate, naphthalene 1,5-diisocyanate, hydrogenated diphenylmethane diisocyanate, hydrogenated tolylene diisocyanate, hydrogenated xylylene diisocyanate, isophorone diisocyanate and the like; buret polyisocyanates such as Sumidur N (made by Sumitomo-Bayer Urethane Co., Ltd.); polyisocyanate compounds having an isocyanulate ring such as Desmodur IL, HL (made by Bayer A. G.) and Colonate EH (made by Nippon Polyurethane Kogyo Co., Ltd.); adduct polyisocyanate compounds such as Sumidur L (made by Sumitomo-Bayer Urethane Co., Ltd.), adduct polyisocyanate compounds such as Colonate HL (made by Nippon Polyurethane Kogyo Co., Ltd.) and the like. These compounds may be used alone or in combination of two or more kinds. In addition, a block isocyanate may be used.

In order to utilize superior weather resistance of a composition made by containing a polymer having hydroxyl groups at both terminals and a polyfunctional isocyanate compound (e), preferable examples of the polyisocyanate compound (e) are isocyanate compounds not having an aromatic ring such as hexamethylene diisocyanate, hydrogenated diphenylmethane diisocyanate, Sumidur N (made by Sumitomo-Bayer Urethane Co., Ltd.) and the like.

The combination ratio between the polymer having hydroxyl groups at both terminals and the polyfunctional isocyanate compound (e) having two or more of an isocyanate group per one molecule is not especially limited, however, for example, it is preferred that a ratio between the isocyanate group which the compound (e) has and the hydroxyl group which the polymer having hydroxyl groups at both terminals has [NCO/OH (mole ratio)] is in a range of from 0.5 to and further preferred that the ratio is in a range of from 0.8 to 1.2. However, in a case where this combination used in an use which requires weather resistance, the mole ratio of NCO/OH may be used up to about 3.0.

Furthermore, in order to accelerate the conversion reaction into an urethan between the polymer having hydroxyl groups at both terminals, which is an ingredient of this invention, and the polyfunctional isocyanate compound (e), as occasion demands, a catalyst known in public such as an organic tin compound, a tertiary amine and the like is freely used.

The amino plastoresin (f) used in the composition of this invention is not especially limited, however, preferable examples of this plastoresin are a reaction product of a triazine ring-containing compound with formaldehyde (a methylolated compound), a low-condensation compound of the triazine ring-containing compound with formaldehyde and its derivatives as well as an urea resin and the like.

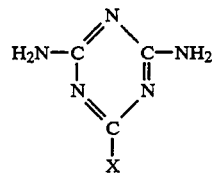

(in the formula, X denotes an amino group, a phenyl group, cyclohexyl group, methyl group, or vinyl group.)

The triazine ring-containing compound shown by the general formula (II) is not especially limited, but preferable ones are, for example, melamine, benzoguanamine, cyclohexanecarboguanamine, methylguanamine, vinylguanamine and the like. These compounds may be used alone or in combination of two or more kinds.

The reaction products of aforementioned triazine ring-containing compounds with formaldehyde and their derivatives are not especially limited, however, their preferable examples are hexamethoxymethylmelamine, tetramethoxymethylbenzoguanamine and the like. Also, the low-condensation compounds of aforementioned triazine ring-containing compounds with formaldehyde and their derivatives are not especially limited, however, preferable examples are a low-condensation compound, in which several of the aforementioned triazine ring-containing compounds are combined through either or both of the —NH—CH$_2$—O—CH$_2$—NH— bond and the —NH—CH$_2$—NH— bond, and an alkyl-etherated formaldehyde resin (Cymel, made by Mitsui Cyanamide Co., Ltd.). These amino plastoresins (f) may be used alone or in combination of two or more kinds.

The ratio between the triazine ring-containing compound and formaldehyde, which are used in synthesizing the amino plastoresin (f) exemplified before, differs depending upon the use, however, a preferable mole ratio between the triazine ring-containing compound and formaldehyde (triazine ring-containing compound/formaldehyde) is in a range of from 1 to 6.

Next, in a composition of this invention which contains, as essential components, a polymer having hydroxyl groups at both terminals and an amino plastoresin (f) as the compound (d), a preferable ratio (weight ratio) between the polymer having hydroxyl groups at both terminals and the amino plastoresin (f) is in a range of from 95/5 to 50/50 and a more preferable one is in a range of from 80/20 to 60/40.

In a composition of this invention which contains, as essential components, a polymer having hydroxyl groups at both terminals and an amino plastoresin (f), in order to accelerate reaction, a catalyst hitherto-known in public such as p-toluenesulfonic acid, benzenesulfonic acid and the like is freely usable.

The compound having two or more of a carboxyl group per one molecule (g) used in this invention is not especially limited, however, its preferable examples are a polyfunctional carboxylic acid and its anhydride such as oxalic acid, malonic acid, succinic acid, glutaric acid, adipic acid, phthalic acid, phthalic anhydride, terephthalic acid, trimellitic acid, trimellitic anhydride, pyromellitic acid, pyromellitic anhydride, maleic acid, maleic anhydride, fumaric acid, itaconic acid, diphenic acid, naphthalenedicarboxylic acid and the like as well as halogenides of these compounds and a polymer having a plural carboxyl group. The compound (g) is used alone or in combination of two or more kinds. A preferable mole ratio between the compound (g) and the polymer having hydroxyl groups at both terminals, [compound (g)/hydroxyl groups in polymer], is in a range of from 1 to 3 and a more preferable one is in a range of from 1 to 2.

When the composition of this invention is used as a composition for coating, because the hardness of coating is required, it is necessary to have a certain degree of crosslinking density. Therefore, a preferable example of the polymer having hydroxyl group at both terminals in using for coating is such as having a hydroxyl group value in a range of from about 20 to 200. That is, in a case where the polymer does not comprise copolymerizing a monomer having a hydroxyl group, a preferable number-average molecular weight of the polymer having hydroxyl groups at both terminals is in a range of from about 500 to 5,000. However, even such as having the number-average molecular weight of 5,000 or more can be used by copolymerizing a monomer having a hydroxyl group. A preferable Tg of the polymer having hydroxyl groups at both terminals in using for coating is in a range of from −30° to 100° C. and a more preferable Tg is in a range of from −10° to 60° C. A polymer having a desirable Tg can be synthesized by controlling the kind and proportion of a using vinyl-based monomer (b). In a case where an plastoresin (f) is used as the compound (d), it is preferred to copolymerize a vinyl-based monomer having an acid group as an inner acid catalyst. In a case where the composition of this invention is used as a composition for coating, in addition to the polymer having hydroxyl groups at both terminals, a low molecular weight compound having a hydroxyl group hitherto-known in public, a polymer having a hydroxyl group hitherto-known in public (an acryl polyol, a polyether polyol, polyester polyol, polycarbonate polyol, polybutadiene polyol, polyolefin polyol and the like), and a resin for coating hitherto-known in public and so forth may be contained.

In a case where the composition of this invention is used as a composition for a tacky adhesive (a tackiness agent), a preferable Tg of the polymer having hydroxyl groups at both terminals is −20° C. or lower, and its preferable molecular weight (weight-average molecular weight) is in a range of from 1,000 to 1,000,000. Also, to further elevate the tackiness to a base material, it is preferable to copolymerize a monomer having an acid group.

In a case where the composition of this invention is used as a composition for a pressure-sensitive adhesive, if required, an additive such as a resin for a tacky adhesive (a resin for a tackiness agent), a tackifier, plasticizer, filler, an aging-preventive and so forth may be contained. An usable tackifier is not especially limited, however, preferable ones are, for example, a rosin type, rosin ester type, polyterpine resin, chroman-indene resin, petroleum-based resin, terpine-phenol resin and the like. The plasticizer is not especially limited, however, preferable ones are, for example, a liquid type polybutene, mineral oil, lanolin, liquid type polyisoprene, liquid type polyacrylate and the like. The filler is not especially limited, however, preferable ones are, for example, zinc white, titanium white, calcium carbonate, clay, various kinds of pigments and so forth. The aging-preventive is not especially limited, however, preferable ones are, for example, a rubber-based oxidation-preventive (a phenol type and an amine type), metal dithiocarbamate and so forth. Each of the aforementioned tackifier, plasticizer, filler and aging-preventive may be used in one kind or in combination of two or more kinds.

In a case where the composition of this invention is used as a composition for an adhesive, a preferable molecular weight (weight-average molecular weight) of the polymer having hydroxyl groups at both terminals is in a range of from 1,000 to 1,000,000. This polymer having hydroxyl groups at both terminals can be used, by combining with an isocyanate compound hitherto-known in public, as an one-solution type or a two-solution type adhesive.

In a case where the composition of this invention is used as a composition for an adhesive, if necessary, there may be contained an additive hitherto known in public, such as polyols (polyols of low molecular weight and polyols of high molecular weight), a tackifier, coupling agent, thixotropic agent, an inorganic filler, a stabilizer and the like. An usable polyol is not especially limited, however, preferable ones of low molecular weight are, for example, ethylene glycol (which may be said as EG), diethylene glycol (which may be said as DEG), dipropylene glycol (which may be said as DPG), 1,4-butanediol (which may be said as 1,4-BD), 1,6-hexanediol (which may be said as 1,6-HD), neopentyl glycol (which may be said as NPG), trimethylolpropane (which may be said as TMP), and preferable ones of high molecular weight are, for example, polyether polyols (polyethylene glycol) (which may be said as PEG), polypropylene glycol (which may be said as PPG), an ethylene oxide/propylene oxide copolymer (which may be said as EO/PO copolymer), a polytetramethylene glycol (which may be said as PTMEG), polyester polyol, castor oil, a liquid type polybutadiene, an epoxy resin, a polycarbonate diol, an acryl polyol and so forth. The tackifier is not especially limited, however, preferable ones are, for example, a terpine resin, phenol resin, terpine-phenol resin, rosin resin, xylene resin and the like. The coupling agent is not especially limited, however, preferable ones are, for example, a silan coupling agent, a titanium coupling agent and the like. The inorganic filler is not especially limited, however, preferable ones are, for example, carbon black, titanium white, calcium carbonate, clay and the like. The thixotropic agent is not especially limited, however, preferable ones are, for example, aerosol, disperone and so forth. The stabilizer is not especially limited, however, preferable ones are, for example, an ultraviolet radiation absorbent, oxidation inhibitor, a heat-resistant stabilizer, a hydrolysis-resistant stabilizer and the like. The aforementioned polyols, tackifiers, coupling agents, thixotropic agents, inorganic fillers and stabilizers: each of these may be used in one kind or in combination of two or more kinds.

Although the use of aforementioned adhesives is not especially limited, for example, there are an adhesive for packing foods and those for shoe and footwear, for dressing and toilets, for lumber, and for structuring (automobiles, sewage disposal facilities and houses) as well as binders for a magnetic tape and fiber-processing, a fiber-processing agent and so forth.

In a case where the composition of present invention is used as a composition for either or both of artificial leather and synthetic leather, as occasion demands, all of the compounds which are used for artificial leather and synthetic leather and hitherto-known in public, can be used. The compounds are, for example, a chain-elongating agent, a polyol of high molecular weight, an organic isocyanate, solvent and so forth. The chain-elongating agent is not especially limited, but preferable polyol-based chain-elongating agents are, for example, EG, DEG, triethylene glycol (which may be said as TEG), DPG, 1,4-BD, 1,6-HD, NPG, hydrated bisphenol A and the like, and preferable polyamine-based chain-elongating agents are 4,4'-diaminodiphenylmethane, tolylene diamine, 4,4'-diaminodicyclohexylmethane, pyperazine and the like. One kind among these compounds may be used, or two or more kinds may be jointly used. Preferable polyols of high molecular weight are a polyether polyol (PEG, PPG, a EO/PO copolymer, and PTMEG), polyester polyol, castor oil, a liquid type polybutadiene, polycarbonate diol, an acryl polyol and the like, and these compounds are used in one kind or in combination of two or more kinds. Preferable organic isocyanates are diphenylmethane 4,4'-diisocyanate (which may be said as MDI), tolylene diisocyanate (which may be said as TDI), isophorone diisocyanate, hexamethylene diisocyanate and the like, and these compounds may be used alone or in combination of two or more kinds. Preferable solvents are dimethylformamide (which may be said as DMF), methyl ethyl ketone (which may be said as MEK), toluene, xylene, tetrahydrofuran (which may be said as THF), dioxane, cellosolve acetate, isopropyl alcohol (which may be said as IPA), ethyl acetate, butyl acetate, cyclohexanone, methyl isobutyl ketone (which may be said as MIBK), acetone and the like, and these compounds may be used alone or in combination of two or more kinds. Also, as occasion demands, it is possible to use an isocyanate compound having three or more of functionality as a crosslinking agent. Furthermore, if necessary, there can be used a catalyst for conversion into urethane, an accelerator, a pigment, dye, surfactant, fiber-softener, an ultraviolet radiation absorbent, antioxidant, a hydrolysis inhibitor, mold-inhibitory agent, an inorganic filler, organic filler, a flatting agent, defoaming agent and so forth. This composition can be used for artificial leather and also, for synthetic leather in a dry system and for synthetic leather in a wet system.

In a case where the composition of present invention is used as a printing ink composition, all of the compounds known in public and hitherto used for printing ink, as occasion demands, can be used in this composition. The compounds are, for example, a chain-elongating agent, a polyol of high molecular weight, an organic isocyanate, solvent and so forth. The chain-elongating agent is not especially limited, however, preferable polyol-based chain-elongating agents are, for example, an aliphatic glycol such as EG, DEG, TEG, DPG, 1,4-BD, 1,6-HD, neopentyl glycol and the like; an alicyclic glycol such as cyclohexane 1,4-glycol and the like; an aromatic glycol such as xylylene glycol, 1,4-dihydroxyethylbenzene, hydrogenated bisphenol A and the like, and preferable polyamine-based chain-elongating agents are an aliphatic diamine such as ethylenediamine, propylenediamine and the like; an alkanolamine such as monoethanolamine, diethanolamine and the like; 4,4'-diaminodiphenylmethane, tolylene diamine, 4,4'-diaminodicyclohexylmethane, pyperazine and the like. One kind among these compounds may be used, or two or more kinds may be used in combination. Preferable polyols of high molecular weight are one kind or two or more kinds of polyether polyols (PEG, PPG, a EO/PO copolymer, and PTMEG), polyester polyols, liquid type polybutadienes, polycarbonate diols and so forth. Preferable organic isocyanates are 1,5-naphtylene diisocyanate, 1,4-phenylene diisocyanate, 4,4'-diphenylmethane diisocyanate, diphenyldimethylmethane 4,4'-diisocyanate, tolylene diisocyanate, isophorone diisocyanate, hexamethylene diisocyanate and the like, and these compounds nay be used alone or in combination of two or more kinds. Preferable solvents are alcohols such as ethanol, isopropanol and the like; ketones such as acetone, MEK, MIBK, cyclohexanone and the like: aromatic hydrocarbons such as toluene, xylene and the like; halogenated hydrocarbons such as chlorobenzene, trichlene, perchlene and the like; ethers such as THF, dioxane and the like; and esters such as cellosolve acetate, ethyl acetate, butyl acetate and the like. These compounds may be used alone or in combination of two or more kinds. Also, as occasion demands, it is possible to use an isocyanate compound having three or more of functionality as a crosslinking agent. Furthermore, if necessary, there can be used a catalyst for conversion into urethane, an accelerator, a colorant such as a pigment and the like, a surfactant, an ultraviolet radiation absorbent, antioxidant, a hydrolysis inhibitor and so forth. Still further, in producing a printing ink composition, if necessary, to mix nitrocellulose, polyvinyl chloride, a vinyl chloride-vinyl acetate copolymer, a polyamide, an acryl acid ester-based polymer and so forth is no problem.

In a case where the composition of present invention is used as a thermosetting type polyurethane elastomer composition, as occasion demands, all of the compounds which are used for a common thermosetting type polyurethane elastomer composition and hitherto known in public can be used for this composition. The compounds are, for example, a chain-elongating agent, hardening agent, polyol of high molecular weight, an organic isocyanate and so forth. The chain-elongating agent is not especially limited, however, preferable polyol-based chain-elongating agents are, for example, an aliphatic glycol such as ethylene glycol, diethylene glycol, triethylene glycol, propylene glycol, dipropylene glycol, 1,3-butanediol, 1,4-butanediol, 1,5-pentanediol, 1,6-HD, neopentyl glycol, 2-ethylhexane-1,3-diol and the like; an alicyclic glycol such as 1,4-cyclohexane glycol and the like; an aromatic glycol such as xylylene glycol, 1,4-dihydroxyethylbenzene, hydrogenated bisphenol A and the like; and these compounds may be used alone or in combination of two or more kinds. Preferable hardening agents are, for example, 3,3'-dichloro-4,4'-diaminodiphenylmethane, 4,4'-diaminodiphenylmethane, o- or p-phenylenediamine, 2,4- or 2,6-tolylenediamine, 4,4'-diamino-3,3'-dimethyldiphenyl, 1,5-naphthylenediamine, tris(4-aminophenyl)methane, trimethylene glycol di-p-aminobenzoate, 2,6-dichloro-p-phenylenediamine, 4,4'-diamino-3,3'-dimethoxycarbonyldiphenylmethane, 2,2'-diaminodiphenyldithioethane, 1,2-bis(2-aminophenylthio)ethane, trimethylene glycol di-p-aminobenzoate, di(methylthio)tolylene diamine, and the like. These compounds may be used alone or in combination of two or more kinds. Preferable polyols of high molecular weight are one kind or two or more kinds of polyether polyols (PEG, PPG, a EO/PO copolymer, and PTMEG), polyester polyols, liquid type polybutadienes, polycarbonate diols, castor oil and so forth. Preferable organic isocyanates are one kind or two or more kinds of 1,5-naphtylene diisocyanate, 1,4-phenylene diisocyanate, a carboimide-modified diphenylmethane diisocyanate, 3,3-dimethyldiphenyl 4,4-diisocyanate, diphenylmethane 4,4'-diisocyanate, diphenyldimethylmethane 4,4'- diisocyanate, tolylene diisocyanate, isophorone diisocyanate, 1,6-hexamethylene diisocyanate, 1,3- or 1,4-cyclohexyl diisocyanate, 1,4- tetramethylene diisocyanate, bis(isocyanatemethyl)cyclohexane and the like. If necessary, a solvent may be used. Preferable solvents are alcohols such as ethanol, isopropanol and the like; ketones such as acetone, MEK, MIBK, cyclohexanone and the like: aromatic hydrocarbons such as toluene, xylene and the like; halogenated hydrocarbons such as chlorobenzene, trichlene, perchlene and the like; ethers such as THF, dioxane and the like; and esters such as cellosolve acetate, ethyl acetate, butyl acetate and the like. These compounds may be used alone or in combination of two or more kinds. Also, as occasion demands, it is possible to use a catalyst for conversion into urethane, an accelerator, a colorant such as a pigment and the like, surfactant, an ultraviolet radiation absorbent, antioxidant, a hydrolysis inhibitor, filler, defoaming agent and so forth.

In the conversion into urethane, an one-shot method and a prepolymer method hitherto-known in public can be used.

Although preferable use of the aforementioned thermosetting type polyurethane elastomer composition is not especially limited, and it is, for example, rolls, a solid tire, castor, various kinds of gears, a connection ring-liner, belt and so forth.

In a case where the composition of present invention is used as a resin composition for floor material, as occasion demands, all of the compounds which have been used for a resin composition and hitherto known in public can be used in this composition. The compounds are, for example, hardening agents, polyols of high molecular weight, organic isocyanates and so forth. A preferable hardening agent is not especially limited, however, preferable polyol-based hardening agents are, for example, an aliphatic glycol such as EG, DEG, TEG, propylene glycol, DPG, 1,3-butanediol, 1,4-BD, 1,5-pentanediol, 1,6-HD, neopentyl glycol, 2-ethylhexane-1,3-diol, glycerol, trimethylolpropane and the like; an alicyclic glycol such as 1,4-cyclohexane glycol and the like; an aromatic glycol such as xylylene glycol, 1,4-dihydroxyethylbenzene, hydrogenated bisphenol A and the like. Preferable amine-based hardening agents are 3,3'-dichloro-4,4'-diaminodiphenylmethane, 4,4'-diaminodiphenylmethane, o- or p-phenylenediamine, 2,4- or 2,6-tolylenediamine, 4,4'-diamino- 3,3'-dimethyldiphenyl, 1,5-naphthylenediamine, tris(4-aminophenyl)methane, trimethylene glycol di-p-aminobenzoate, 2,6-dichloro-p-phenylenediamine, 4,4'-diamino-3,3'-dimethoxycarbonyldiphenylmethane, 2,2'-diaminodiphenyldithioethane, a methylenedianiline-NaCl complex. 4,4'-methylene-bis(o-chloroaniline), 1,2-bis(2-aminophenylthio)ethane, trimethylene glycol di-p-aminobenzoate, di(methylthio) tolylenediamine, ethylene diamine, triethylenetetramine, hexamethylenediamine carbamate and the like. These compounds may be used alone or in combination of two or more kinds. Preferable polyols of high molecular weight are one kind or two or more kinds of polyether polyols (PEG, PPG, a EO/PO copolymer, and PTMEG), polyester polyols, polymer polyols, liquid type polybutadienes, polyolefine polyols, polycarbonate diols, castor oil and so forth. Preferable organic isocyanates are one kind or two or more kinds of 1,5-naphtylene diisocyanate, 1, 4-phenylene diisocyanate, a carbodiimide-modified diphenylmethane diisocyanate, 3,3'-dimethyldiphenyl 4,4'-diisocyanate, diphenylmethane 4,4'-diisocyanate, diphenyldimethylmethane 4,4'-diisocyanate, tolylene diisocyanate, isophorone diisocyanate, 1,6-hexamethylene diisocyanate, 1,3- or 1,4-cyclohexyl diisocyanate, 1,4-tetramethylene diisocyanate, bis(isocyanatemethyl)cyclohexane, triphenylmethane triisocyanate and the like. If required, a solvent may be used. Preferable solvents are one kind or two or more kinds of alcohols such as ethanol, isopropanol and the like; ketones such as acetone, MEK, MIBK, cyclohexanone and the like: aromatic hydrocarbons such as toluene, xylene and the like; halogenated hydrocarbons such as chlorobenzene, trichlene, perchlene and the like; ethers such as THF, dioxane and the like; and esters such as cellosolve acetate, ethyl acetate, butyl acetate and the like. Also, as occasion demands, it is possible to use a catalyst for conversion into urethane, an accelerator, a plasticizer, tackifier, a colorant such as a pigment and the like, surfactant, an ultraviolet radiation absorbent, antioxidant, a hydrolysis inhibitor, filler, defoaming agent and so forth.

Although preferable use of the aforementioned resin compositions for floor material is not especially limited, and it is, for example, a floor material for a vessel and building, a waterproof agent for a paint film, a waterproof agent for a sheet, a spraying waterproof agent, sealing compound, an adhesive for artificial lawn and the like, an asphalt improver for road pavement, an elastic material to pave tennis court and a field for track events, a preventive for coated floor material concrete and so forth.

In a case where the composition of this invention is used as a polyurethane foam composition, a preferable molecular weight (weight-average molecular weight) of the polymer having hydroxyl groups at both terminals is in a range of from 1,000 to 1,000,000.

In a case where the composition of this invention is used as a polyurethane foam composition, as occasion demands, the following compounds hitherto-known in public may be contained, that are polyols (which are polyols of low molecular weight, polyols of high molecular weight and the like other than the polymer having hydroxyl groups at both terminals obtained from the production method of present invention), a polyisocyanate (for example, TDI, MDI and the like), a catalyst (for example, an amine-based, a tin-based and the like), water, a surfactant (for example, a silicon-based, nonionic type, an ionic type and so forth), an additive (for example, a fire retardant, an antimicroorganismic agent, a colorant, filler, stabilizer and so forth), a foaming auxiliary agent (for example, halogenated hydrocarbon and the like) and so forth.

In a case where the composition of this invention is used as a composition for a sealing compound, a preferable molecular weight (weight-average molecular weight) of the polymer having hydroxyl groups at both terminals is in a range of from 1,000 to 1,000,000.

In case where the composition of this invention is used as composition for a sealing compound, as occasion demands, the following compounds hitherto-known in public may be contained, which are polyols (polyols of high molecular weight and the like other than the polymer having hydroxyl groups at both terminals obtained from the production process of this invention), a polyisocyanate (for example, TDI, MDI and the like), a catalyst (for example, an amine-based, a tin-based, lead-based and the like), an inorganic, filler (for example, calcium carbonate, talc, clay, silica, carbon black, titanium white and so forth), a plasticizer [for example, dioctyl phthalate (which may be said as DOP), di-i-decyl phthalate (which may be said as DIDP), dioctyl adipinate (which may be said as DOA) and the like], an antisagging agent (for example, colloid type silica, hydrated castor oil, organic bentonite, surface-processed calcium carbonate and so forth), an antiaging agent (for example, hindered phenols, benzotriazols, hindered amines and the like), a foaming inhibitor (for example, a dehydrating agent, carbon dioxide absorbent and the like) and so forth.

If a polymer obtained by converting the hydroxyl groups of a polymer having hydroxyl groups at both terminals, obtained from the production process of this invention, into a hydroxysilyl, an alkoxysilyl, or a mercapto group is used as an essential component in a composition for a sealing compound, the composition for a sealing compound becomes a composition for a sealing compound having a crosslinking system different from the urethane system.

Next, there is explained a polymer having polymerizable unsaturated groups at both terminals.

When the polymer having polymerizable unsaturated groups at both terminals is synthesized, the compound (h) having two kinds of reactive groups together in one molecule, that are a functional group capable of reacting with a hydroxyl group and a polymerizable unsaturated group, is led to a reaction with a polymer having hydroxyl groups at both terminals; and although said compound (h) is not especially limited, a preferable one is, for example, a vinyl-based monomer having an isocyanate group, a carboxyl group, a methylolated triazine ring and the like. More practically, the examples are methacryloyloxyethyl isocyanate, methacryloyl isocyanate, isopropenyldimethylbenzyl isocyanate, (meth)acrylic acid, maleic acid, maleic anhydride, fumaric acid, itaconic acid, itaconic anhydride, and halogenides of these carboxyl groups, and a methylolated compound of vinylguanamine and the like.

Also, in this reaction, it is free to use a solvent or a catalyst hitherto-known in public. Preferable examples of this catalyst, in the case where the functional group which the compound (h) has is an isocyanate group, are tertiary amines such as triethylamine and the like and tin compounds such as dibutyltin dilaurate and the like. The preferable examples, the case where said functional group is a carboxyl or an acid anhydride group, are amine compounds such as triethylamine, pyridine and the like, inorganic acids such as sulfuric acid, alkali metal salts of organic acids and the like. The preferable examples, in the case where said functional group is a methylolated compound of a triazine ring, are sulfonic acids such as dodecylbenzenesulfonic acid and the like, and other weak acids and the like.

In a case where the polymer having polymerizable unsaturated groups at both terminals is used as an essential component of a resin composition, a preferable example of the other component contained in this resin composition is a vinyl-based monomer having one polymerizable unsaturated group per one molecule and the like. This vinyl-based monomer is not especially limited, and any monomer hitherto-known in public can be used with no problem. For example, the aforementioned compounds are used as the vinyl-based monomer (b). In this resin composition, if required, a polymerization initiator hitherto-known in public may be contained. Although the energy source to initiate the polymerization reaction is not especially limited, for example, light, EB, UV, radiation, heat and so forth can be used.

Examples of the resin composition, which contains the polymer having polymerizable unsaturated groups at both terminals and a vinyl-based monomer having one polymerizable unsaturated group in one molecule as essential components, are a gel coat resin composition and a resin composition for artificial marble, which are illustrated below in detail.

The gel coat resin composition, as occasion demands, may contain a polyfunctional vinyl-based monomer (i) having two or more of a polymerizable unsaturated group per one molecule. Preferable examples of this polyfunctional vinyl-based monomer (i) are ethylene glycol di(meth)acrylate, diethylene glycol di(meth)acrylate, triethylene glycol (meth)acrylate, propylene glycol di(meth)acrylate, methylenebisacrylamide, 1,6-hexanediol di(meth)acrylate, trimethylolpropane tri (meth) acrylate, pentaerythritol tri(meth)acrylate, pentaerythritol tetra(meth)acrylate, dipentaerythritol tetra(meth)acrylate, dipentaerythritol hexa(meth)acrylate and the like. These compounds can be used alone or in combination of two or more kinds.

The weight ratio (polymer having polymerizable unsaturated groups at both terminals/vinyl-based monomer) between the polymer having polymerizable unsaturated groups at both terminals and the vinyl-based monomer, both of which are contained in the gel coat resin composition, is not especially limited, but a preferable ratio is in a range of from 10/90 to 60/40 and a more preferable one is in a range of from 20/80 to 50/50. If the ratio is smaller than 10/90, since reaction contraction of the gel coat resin layer is too large, contraction strain becomes large and a superior coat surface is hard to obtain. Also, if the ratio is larger than 60/40, viscosity of the gel coat resin composition becomes too high and extreme dropping of working efficiency is apt to occur.

In order to obtain the surface hardness of a gel coat layer, it is preferable that Tg of a polymer having polymerizable unsaturated groups at both terminals and Tg of a vinyl-based monomer used in the present use are both 20° C. or more. Also, in a case where it is necessary to raise crosslinking density in order to get the surface hardness, it is preferable to copolymerize a monomer having a hydroxyl group in the polymer having polymerizable unsaturated groups at both terminals and to use the polyfunctional vinyl-based monomer (i) in a proportion of 50 weight % or less to the total amount of the polymer having polymerizable unsaturated groups at both terminals, the vinyl-based monomer having one polymerizable unsaturated group per one molecule, and the polyfunctional vinyl-based monomer (i).

Into the gel coat resin composition, as occasion demands, a polymerization inhibitor such as hydroquinone, catechol, 2,6-di-tertiary-butyl-p-cresol and the like is added, and then, said composition is hardened by an initiator exemplified by the aforementioned initiators (c), especially, by an organic peroxide initiator and the like. In this case, a curing accelerator may be jointly used, and its examples are various kinds of reductive metal compounds such as cobalt naphthenic acid, nickel naphthenic acid, iron naphthenic acid and the like, and reductive compounds such as amines and mercaptanes.

To the gel coat resin composition, as occasion demands, various kinds of additives such as thixotropic agents hitherto-known in public such as silica, asbestos powder, hydrogenated castor oil, a fatty acid amide and so forth, and a filler, stabilizer, deforming agent, leveling agent and so forth can be combined as others than a dye, plasticizer, an ultraviolet radiation absorbent and so forth.

Into the resin composition for artificial marble, as occasion demands, are freely added the polyfunctional vinyl-based monomer having two or more of a polymerizable unsaturated group per one molecule (i) and additives such as a filler, hardening agent, thermoplastic polymer and the like.

Although the polyfunctional vinyl-based monomer (i) added in case of need into a resin composition for artificial marble is not especially limited, its examples are polyfunctional (meth)acrylates such as ethylene glycol di(meth)acrylate, propylene glycol di(meth)acrylate, butylene glycol di(meth)acrylate, neopentyl glycol di(meth)acrylate, glycerol tri(meth)acrylate, trimethylolpropane tri(meth)acrylate, dipentaerythritol hexa(meth)acrylate and the like; and methylene bis(meth)acrylamide, divinylbenzene and the like. An adding amount of the polyfunctional vinyl-based monomer (i) is not especially limited, however, a preferable amount is 40 weight % or less against a total amount of the polymer having polymerizable unsaturated groups at both terminals, the vinyl-based monomer having one polymerizable unsaturated group per one molecule, and the polyfunctional vinyl-based monomer (i). If the adding amount of the polyfunctional vinyl-based monomer (i) exceeds 40 weight %, the obtained artificial marble becomes hard and fragile, so that this is a undesirable matter.

Preferable fillers which are, in case of need, added into the resin composition for artificial marble are aluminum hydroxide, magnesium hydroxide, calcium hydroxide, calcium carbonate, talc, clay, silica, quartz, alumina, zirconia, glass powder, glass fiber; natural crushed stones such as marble, limestone, pyroxene, amphibole, sandstone, granite, basalt and the like; crushed matters of synthetic resins such as a unsaturated polyester resin, thermosetting acrylic resin, melamine resin and the like. An adding amount of the fillers is not especially limited, but a preferable one is in a range of from 100 to 800 weight % to a total amount of the polymer having polymerizable unsaturated groups at both terminals, the vinyl-based monomer having one polymerizable unsaturated group per one molecule and the polyfunctional vinyl-based monomer (i). If the adding amount is less than 100 weight %, there exists a case where heat resistance and fire retardation are not enough, and if it exceeds 800 weight %, dispersion of the filler into the polymer having polymerizable unsaturated groups at both terminals, the vinyl-based monomer having one polymerizable unsaturated group per one molecule and the polyfunctional vinyl-based monomer (i) may become insufficient and homogeneous artificial marble may not be obtained because of fluidity loss in the course of molding and hardening.

The hardening agent which is, in case of need, added into the resin composition for artificial marble is not especially limited, but preferable examples of the agent are benzoyl peroxide, cyclohexanone peroxide, methyl ethyl ketone peroxide, bis(4-tertiary-butylcyclohexyl)peroxydicarbonate, tertiary-butyl peroxybenzoate, tertiary-butyl peroxyoctate and the like. Among these compounds, preferable one for press molding is tertiary-butyl peroxyoctate or benzoyl peroxide, which give a hardened product not forming cracks with good transparency and which are hardening agents used at a moderately high or a high temperature. Although the hardening agents used at a moderately high or a low temperature are used alone or with an organic amine or a salt of polyvalent metals in combining with a curing accelerator, a preferable agent for casting is bis(4-tertiary-butylcyclohexyl)peroxydicarbonate (Perkadox PX-16, made by Nihon Kayaku Co. Ltd.).

The thermoplastic polymer which is, in case of need, added in to the resin composition for artificial marble, not especially limited, but preferables examples of the polymer are (meth)acryl-based polymers such as polymethylmethacrylate and the like; polymers of a low extent of contraction hitherto-known in public such as a (meth)acrylate-styrene copolymer, polystyrene, polyvinyl acetate, a styrene-vinyl acetate copolymer, polyvinyl chloride, polybutadiene, polyethylene, polycaprolactam, saturated polyester and the like. These compounds are used alone or in joint use. However, if the polymer of a low extent of contraction is combined in a large amount, viscosity-rise in the course of kneading occurs, so that a formulated matter for casting having a high filler content is hard to obtain and a product inferior in transparency and heat resistance may be only obtained. Therefore, it is preferred to use the thermoplastic polymer of a low extent of contraction in an amount as small as possible, and a preferable amount for use is not especially limited, but it is in a range of 100 weight 2 or less against a total amount of the polymer having polymerizable unsaturated groups at both terminals, the vinyl-based monomer having one polymerizable unsaturated group per one molecule and the vinyl-based monomer (i).

Next, the polymer having carboxyl groups at both terminals is explained.

In synthesizing the polymer having carboxyl groups at both terminals, a preferable compound (j) having in one molecule two kinds of reactive groups, which are a functional group capable of reacting with a hydroxyl group and a carboxyl group, is led to a reaction with the polymer having hydroxyl groups at both terminals. The compound (j) is not especially limited, but its examples are dibasic acids such as oxalic acid, malonic acid, succinic acid, glutaric acid, adipic acid, pimelic acid, suberic acid, azelaic acid, sebacic acid, dodecane diacid, phthalic acid, terephthalic acid, maleic acid, fumaric acid, itaconic acid and the like; and halogen-substituted carboxylic acids such as chloroacetic acid, bromoacetic acid and the like. Like the above-mentioned, the two kinds of reactive groups contained in the compound (j), which are a functional group capable of reacting with a hydroxyl group and a carboxyl group, may be two carboxyl groups or combination of a functional group other than the carboxyl group such as a halogeno group and the like with a carboxyl group. Instead of the compound (j), an acid anhydride may be used or the compound (j) and an acid anhydride may be jointly used. The acid anhydride is not especially limited and preferable one is for example, succinic anhydride, glutaric anhydride, phthalic anhydride, maleic anhydride, itaconic anhydride and the like.

In a reaction of the polymer having hydroxyl groups at both terminals with either or both of the compound (j) and an acid anhydride, a solvent or a catalyst hitherto-known in public are freely used. In a case where the functional group which is contained in the compound (j) and capable of reacting with a hydroxyl group a carboxyl group, preferable examples of the catalyst are an inorganic acid such as sulfuric acid, hydrochloric acid and the like; an inorganic base such as sodium hydroxide, potassium hydroxide and the like; a tertiary amine compound such as triethylamine, pyridine and the like; an organic acid salt such as sodium acetate, potassium acetate and the like. In a case where the compound (j) has a halogen group, the examples are tertiary amine compounds such as pyridine, triethylamine and the like.

The reaction temperature in the case where the functional group contained in the compound (j) and capable of reacting with a hydroxyl group is a carboxyl group (for example, a case where the compound (j) is dibasic acid) is not especially limited, but preferable one is in a range of from 60° to 100° C. If the temperature is lower than 60° C., the reaction rate is slow and the final exchange percentage is low. If it exceeds 100° C., the reaction rate of a dibasic acid becomes high, but there occurs a problem that the forming amount of a diester increases and the molecular weight of after reaction also increases.

Next, there is explained a resin composition which shows a feature of containing, as essential components, the polymer having carboxyl groups at both terminals relating to the present invention and the compound (k) having two or more of a functional group capable of reacting with a carboxyl group per one molecule.

The polymer having carboxyl groups at both terminals may be used alone or in combination of two or more kinds. Also, the weight ratio between the polymer having carboxyl groups at both terminals and the compound (k) contained in this resin composition (polymer having carboxyl groups at both terminals/the compound (k)) is not especially limited, but preferable one is in a range of from 99.99/0.01 to 40/60 and more preferable one is in a range of from 99.9/0.1 to 60/40.

The compound (k) having two or more of a functional group capable of reacting with a carboxyl group per one molecule is not especially limited, but its preferable examples are a compound having two or more of an epoxy group per one molecule, a compound having two or more of a hydroxyl group per one molecule, a compound having two or more of an amino group per one molecule, a compound having two or more of a mercapto group per one molecule, a compound having two or more of a halogeno group per one molecule, a compound having two or more of an oxazoline group per one molecule, a compound having two or more of an aziridine group per one molecule, a compound having two or more of an ester group per one molecule, a compound having two or more of a carboxyl group per one molecule and the like.

The polymer having carboxyl groups at both terminals may be used as an essential component of the epoxy resin composition. The epoxy resin, which is another essential component contained in the epoxy resin composition like the above, is not especially limited as far as it is an epoxy resin hitherto-known in public, and its preferable examples are glycidyl ethers of the phenols such as bisphenol A, bisphenol F, phenol novolac, cresol novolac, brominated bisphenol A and the like; glycidyl ethers of the alcohols such as butanol, butanediol, polyethylene glycol, poly propylene glycol and the like; glycidyl ethers of the acids such as hexahydrophthalic acid, dimer acid and the like. These compounds are used alone or may be used in combination of two kinds or more.

Into the aforementioned epoxy resin compounds, as occasion demands, an additive such as a filler, pigment, hardening agent and so forth is freely added. Preferable examples of the filler are aluminum hydroxide, magnesium hydroxide, calcium hydroxide, calcium carbonate, talc, clay, silica, kaolin, titanium oxide, quartz, quartz glass, alumina, zirconia, glass powder, glass fiber, natural crushed stones such as marble, limestone, pyroxene, amphibole, sandstone, granite, basalt; crushed matters of the synthetic resins such as a unsaturated polyester resin, thermosetting acrylic resin, melamine resin and the like. Preferable examples of the hardening agent are aliphatic amines of straight chain types such as diethylenetriamine, triethylenetetramine, tetraethylenepentamine, diethylaminopropylamine and the like; various polyamides having different amine values; alicyclic amines such as menthenediamine, isophoronediamine, bis(4-aminocyclohexyl)methane and the like; aromatic amines such as m-xylenediamine, diaminodiphenylmethane, diaminodiphenylsulfone, m-phenylenediamine and the like; acid anhydrides such as phthalic anhydride, tetrahydrophthalic anhydride, hexahydrophthalic anhydride, methyltetrahydrophthalic anhydride, methylhexahydrophthalic anhydride, nadic methyl anhydride, dodecylsuccinic anhydride, pyromellitic anhydride, methylcyclohexenetetracarboxylic anhydride, trimellitic anhydride, polyazelaic anhydride and the like; compounds containing a phenolic hydroxyl group such as phenol novolac, cresol novolac and the like; polymercaptanes; anionic polymerization catalysts such as 2,4,6-tris(dimethylaminomethyl)-phenol, 2-ethyl-4-methylimidazole and the like; cationic polymerization catalysts such as a boron trifluoride-monoethylamine complex and the like; potential hardening agents represented by dicyanediamide, an amine adduct, a hydrazide, an amidoamine, a block isocyanate, carbamic acid salt, ketimine, an aromatic diazonium salt and the like. These compounds are used alone or in combination of two kinds or more.

Next, polyurethanes of this invention are explained.

The polyfunctional isocyanate compound (e) having two or more of an isocyanate group per one molecule, which is used to synthesize the polyurethanes, is as mentioned before. The polyol component (l) containing a polymer having hydroxyl groups at both terminals, other than the polymer having hydroxyl groups at both terminals, is not especially limited as far as it is a polyol, but if necessary, one or two kinds or more selected from the following compounds are used in combination; which are polyols of low molecular weight such as ethylene glycol, diethylene glycol, triethylene glycol, propylene glycol, 1,4-butanediol, 1,3-butanediol, 1,6-hexanediol, trimethylol propane, pentaerythritol and the like; polyether polyols such as polyethylene glycol, polypropylene glycol, a polypropylene glycol -polyethylene glycol block copolymer and the like; polyester polyols synthesized from the aforementioned polyols of low molecular weight with a polyfunctional carboxylic acid such as phthalic acid, phthalic anhydride, terephthalic acid, maleic acid, maleic anhydride, fumaric acid, malonic acid, succinic acid, glutaric acid, adipic acid and the like; polycarbonate polyols; diene-based polyols consisting of butadiene and a butadiene-acrylonitrile copolymer main chain; polyols of high molecular weight such as a polyolefin polyol, polymer polyol, an acryl polyol and the like.

To synthesize these compounds, a total amount of the polyol component (l) and polyfunctional compound (e) may be allowed to react at one stage, or a specific component in the polyol component (l) is allowed to react with the polyfunctional isocyanate compound (e) at the first stage to prepare a polymer (oligomer) having isocyanate groups at both terminals and then, this polymer (oligomer) is allowed to react with another (or the same) polyol component at the next s rage. By repeating these, a multistage reaction may be used to synthesize the polyurethane. However, in a case of the multistage reaction, there is a case where it is necessary in the way to remove an isocyanate compound remained after reaction.

In a case of using various kinds of polyols as the polyol component (1) and wanting to synthesize a polyurethane of block structure, in which the sequence such as ABA, $(AB)_n$, ABCBA and the like is controlled, it is preferred to use the aforementioned multistage reaction.

As described above, the polymer having hydroxyl groups at both terminals is very useful as a material to prepare various kinds of block polymers.

Also, in a case of using a polymer having hydroxyl groups at only both terminals and using a compound having only two of an isocyanate group per one molecule as the polyfunctional isocyanate compound (e), only a thermoplastic polymer is mostly obtained. However, in a case of using a polymer having hydroxyl groups at both terminals as well as other positions as the polymer having hydroxyl groups at both terminals or in a case of using a compound having three or more of an isocyanate group per one molecule as the polyfunctional isocyanate compound (e), there is a case where both of a branched thermoplastic polyurethan and a thermosetting polyurethane are obtained, depending upon the reaction conditions.

In synthesizing the polyurethane of present invention, the ratio of amounts for use between the polymer having hydroxyl groups at both terminals and the polyfunctional isocyanate compound (e) is not especially limited. For example, in a case of the aforementioned multistage reaction, if the mole ratio between the isocyanate group in the compound (e) and the hydroxyl group in the polymer having hydroxyl groups at both terminals (NCO/OH) is higher than 1, there is no problem. However, in order to prevent increase of molecular at weight this stage and synthesize a polyurethane having a definite block structure, a preferable ratio is in a range of from 1.2 to 2.0 and a more preferable one is in a range of from 1.5 to 2.0. Furthermore, in one-step reaction, a preferable mole ratio between the isocyanate group in the polyfunctional isocyanate compound (e and the hydroxyl group in the polymer having hydroxyl groups at both terminals (NCO/OH) is in a range of from 0.5 to 1.5 and a more preferable one is in a range of from 0.8 to 1.2.

In synthesizing the polyurethane of present invention, in order to accelerate the reaction to convert into the urethane, a catalyst known in public such as an organic tin compound or a tertiary amine or various kinds of solvents are freely usable.

The polyol component containing the polymer having hydroxyl groups at both terminals (1) obtained from the production process of present invention as an essential component can be led to a polyester by reacting with the compound having two or more of a carboxyl group (g) per one molecule.

The polyol component containing the polymer having hydroxyl groups at both terminals (1) as an essential component used in synthesizing this polyester is the same as that explained in the aforementioned polyurethanes. Also, the compound having two or more of a carboxyl group per one molecule (g) is the same as the aforementioned.

In addition, this synthesis, a total amount of the polyol component (1) and the compound having two or more of a carboxyl group (g) may be allowed to react at one stage, or a multistage reaction to synthesize a polyester may be used which comprises allowing a specific polyol in the polyol component (1) and the compound having two or more of a carboxyl group per one molecule (g) to react at the first stage to prepare a polymer (an oligomer) having carboxyl groups at both terminals, further allowing this polymer oligomer) to react with another (or the same) polyol component at the next stage, and repeating reactions at these stages. However, in the multistage reaction, there is a case where, in the way of reaction, removing of the compound having a carboxyl group remained after reaction is necessary.

In a case of using various kinds of polyols as the polyol component (1) and wanting to synthesize a polyurethane of block structure, in which the sequence such as ABA, $(AB)_n$, ABCBA and the like is controlled, it is preferred to use the aforementioned multistage reaction.

As described above, the polymer having hydroxyl groups at both terminals is very useful as a material to prepare various of kinds of block polymers.

In synthesizing the aforementioned polyester, in order to accelerate the esterification reaction, a catalyst known in public such as an inorganic acid and the like (for example, sulfuric acid) or various kinds of solvents are freely usable.

In a case where the polyurethane of this invention and the aforementioned polyester are used as a thermoplastic elastomer, it is required that these polyurethane and polyester are thermoplastic. For this, in synthesizing the polyurethane and polyester, it is preferred to use a difunctional isocyanate and difunctional carboxylic acid as a main component of the polyfunctional isocyanate compound (e) and the compound having two or more of a carboxylic group per one molecule (g), and also, to use a difunctional polyol as a main component of the polyol (1).

Furthermore, in order to display performance of the thermoplastic elastomer sufficiently, because a block structure in which a hard segment and soft segment are regularly arranged is required, synthesis by the multistage reaction is preferred.

The following additives may be added to the above thermoplastic elastomer as far as the practicality is not damaged, and preferable examples of the additives are inorganic fillers such as glass fiber, carbon fiber, boron fiber, alumina fiber, calcium carbonate, titanium oxide, mica, talc and so forth; fire retarding agents such as phosphoric acid esters and the like; ultraviolet radiation absorbents such as benzophenones and the like; hindered phenol-based antioxidants such as butylhydroxytoluene and the like; crystallization accelerators such as highly crystallized polyethylene terephthalate and the like.

In a case where the polyurethane of this invention or the aforementioned polyester is used as a molding material, as occasion demands, for example, glass fiber such as contained in a conventional molding material, a filler such as pulp and so forth, a mold-releasing material, calcium carbonate, a pigment such as titanium oxide and the like, an ultraviolet radiation absorbent, an antioxidative material and so forth may be contained as other components in the molding material. As the molding method may be used any molding method hitherto-known in public. Concerning the shape of moldings, various shapes such as a film type, a sheet type and so forth can be made from the molding material.

The block polymer containing the polymer having hydroxyl groups at both terminals as an essential component relating to the present invention is explained.

The process to obtain this block polymer is not especially limited, however, there are cited, for example, the under-described processes of from ① to ④.

① A process which comprises using two kinds or more of polyols as the polyol component (1) containing the polymer having hydroxyl groups at both terminals obtained from the production method of this invention and carrying out a reaction of the polyols with a compound having two or more of a functional group capable of reacting with a hydroxyl group per one molecule.

② A process which comprises carrying out a reaction of the polymer having hydroxyl groups at both terminals obtained from the production method of this invention with a polymer having only one hydroxyl group per one molecule and a compound having two or more of a functional group capable of reacting with the hydroxyl group per one molecule.

③ A process which comprises carrying out a reaction of the polymer having hydroxyl groups at both terminals obtained from the production method of this invention with a compound having two or more of a functional group capable of reacting with the hydroxyl group per one molecule.

④ A process which comprises using the polymer having hydroxyl groups at both terminals obtained from the production method of this invention as an initiator and obtaining an ABA type block polymer by carrying out a ring-opening polymerization reaction of one kind or two or more kinds of a cyclic ether such as ethylene oxide, propylene oxide, tetrahydrofuran and the like.

In the above-described ①, ② and ③ processes, the functional group capable of reacting with a hydroxyl group is not especially limited, but preferable ones are, for example, an isocyanate group, a carboxyl group, triazine ring, methylolated triazine ring, an acid anhydride group, azlactone ring, a silanol group, carbonate group, an epoxy group, acid halide group and the like.

The reaction procedure in the ①, ② and ③ processes is not especially limited, however, any one of the one stage process and multistage process described in the explanation of aforementioned polyurethanes and polyesters can be used. The use of block polymers of this invention is not especially limited, however, it is, for example, a surfactant, an agent for compatibility, a resin for toner, hot melt adhesive, thermoplastic elastomer, thermosetting elastomer, resin-improver, tacky adhesive (tackiness agent disperser, heat-resistant transparent resin, an impact-resistant transparent resin, artificial leather, a synthetic leather, water-reducing agent for cement, an urethane foam and so forth.

The structure of block polymers of this invention is not especially limited, but it is by itself settled according to their use. For example, if the use for a surfactant is explained as an example, it is desirable that the two or more kinds of segments making the block polymer consist of a hydrophilic segment and hydrophobic segment. If the use for a thermoplastic elastomer is explained as an example, it is desirable that the two or more kinds of segments making the block polymer differs by 10° C. or more each other in glass transition temperature.

In the production process of this invention, the formation of a by-product polymer in which the hydroxyl group is not borne at one terminal or both terminals at all is suppressed by maintaining a mole ratio of the compound (a) to the radical polymerization-initiator (c) [(a)/c)] in a reaction vessel in the course of polymerization always at 50 or more. That is, if the mole ratio of the compound (a) to the radical polymerization-initiator (c) in a reaction vessel in the course of polymerization becomes less than 50, the polymerization reaction is initiated without sufficient transference of radicals generated from the radical polymerization-initiator (c) to the compound (a), and the formation of a by-product polymer in which the hydroxyl group is not borne at one terminal or both terminals at all can not be neglected. If the mobile ratio is 50 or more, the formation of the by-product polymer practically decreases to such an extent as no problem. If the mole ratio becomes 60 or more, it is more preferable because the above-described by-product formation decreases to an almost negligible extent. Also, if the mole ratio is 100 or more, the above-described by-product formation decreases to completely negligible extent.

In the production process of this invention, any component other than the compound (a), vinyl-based monomer (b) and radical polymerization-initiator (c) is not practically used in the polymerization process. As a matter of fact, a component other than the compound (a), vinyl-based monomer (b) and radical polymerization-initiator (c) is controlled in an extent of 10% by weight or less of the total. One of reasons why an excellent result was obtained by arranging like the above-mentioned is considered as follows. That is, if any component (for example, a solvent) other than the compound (a), vinyl-based monomer (b) and radical polymerization-initiator (c) exists in more than 10% by weight of the total, it is considered that a side reaction such as a chain transfer reaction to this component increases, polymers of not bearing the hydroxyl group at one terminal or both terminals at all are formed as by-products and, as a result, the value of terminal hydroxyl group number decreases. However, the reason why an excellent result is obtained by arranging a component other than the compound (a), vinyl-based monomer (b) and radical polymerization-initiator (c) in 10% by weight or less can not be considered by only the chain transfer constants of a vinyl-based monomer and a forming polymer, and there remain a lot of unclear points about details.

In a polymerization process in the production process of this invention, particularly in a batch type polymerization, it is preferable that at least a part of a necessary amount of the compound (a) is charged beforehand into a polymerization vessel, to which the vinyl-based monomer (b) and radical polymerization-initiator (c) are supplied. One of reasons why an excellent result was obtained by doing like the above-mentioned is considered as follows. That is, if the polymerization is carried out with charging at least a part of a necessary amount of the compound (a) at an initial stage, it is considered that the compound (a) always exists in large excess in the course of the polymerization reaction compared with the radical polymerization-initiator (c) and, thereby, radicals formed from the radical polymerization-initiator (c) does not directly added to the vinyl-based monomer, but they undergo chain-transfer rapidly to the compound (a), and the hydroxyl groups are easily introduced into terminals of the polymer.

The polymer having hydroxyl groups at both terminals obtained from the production process of this invention has transparency, weather resistance, water resistance, hydrolysis resistance, and chemical resistance, by choosing a sort of the vinyl-based monomer (b) optionally, which constitutes a main chain of the polymer. Also, since various kinds of resins such as polyester resins, polyurethane resins, polycarbonate resins and so forth as well as various kinds of block polymers derived from the polymer having hydroxyl groups at both terminals display features of very stretching (bending processing is excellent) and toughness, they are very useful as raw materials for coating, an elastic wall material, a floor material, waterproof for paint film, a tacky adhesive (a tackiness agent), tackifier, an adhesive, a binder, sealing compound, urethane foam (hard, semihard, soft type urethane RIM, an UV.EB curing resin, high solid coating, thermosetting elastomer, thermoplastic elastomer, various molding materials, microcellular, artificial leather, synthetic leather, elastic fiber, a fiber-processing agent, plasticizer, sound absorption material, vibration-controlling material, surfactant, gel court agent, resin for artificial marble, an impact resistance-affording agent for artificial marble, a resin for laminated glass, reactivity diluent and so forth, and in addition, as various resin additives and raw materials for these and the like.

It is possible to convert easily the polymer having hydroxyl groups at both terminals into a polymer having other functional groups at both terminals (examples of the functional groups are a polymerizable unsaturated group such as a vinyl group, an amino group, a carboxyl group, an acetylenic group, epoxy group, a silanol group, an alkoxysilyl group, a hydroxysilyl group, mercapto group, an oxazoline group, a maleimide group, an azlactone group, a lactone group, bromine, chlorine and so forth) by undergoing a suitable reaction on both the terminal hydroxyl groups. The thus-obtained polymers are also very useful. For example, the polymer having carboxyl groups at both terminals is very effective as a impact resistance-affording agent for epoxy adhesives. Also, a raw material for surfactants and the like is obtained by adding a plural of ethylene oxide or propylene oxide to the terminal hydroxyl groups.

In a case where a composition containing the polymer having hydroxyl groups at both terminals and the polyfunctional isocyanate compound (e) as essential components as well as a composition containing the polymer having hydroxyl groups at both terminals and the aminoplast resin (f) as essential components are used as coating, a very excellent paint film can be obtained, which is not only soft and tough, but also superior in weather resistance, water resistance, hydrolysis resistance, chemical resistance, hardness and so forth.

In a case where a composition containing the polymer having hydroxyl groups at both terminals and the polyfunctional isocyanate compound (e) as essential components is used as a sealing compound, there can be obtained a sealing compound which is very soft, tough, and superior in weather resistance, water resistance and chemical resistance.

In a case where a composition containing the polymer having hydroxyl groups at both terminals and the polyfunctional isocyanate compound (e) as essential components is used for the use of urethane foam and thermosetting polyurethane elastomer, there can be obtained a urethane foam and an elastomer which are superior in softness, weather resistance, water resistance, and chemical resistance.

In a case where a composition containing in one molecule a polymerizable monomer having a polymerizable unsaturated group as an essential component in addition to a polymer having polymerizable unsaturated groups at both terminals, which is obtained from a reaction of the polymer having hydroxyl groups at both terminals with the compound (h) having two kinds of reactive groups, that are a functional group capable of reacting with the hydroxyl group and a polymerizable unsaturated group, is used for the use of a gel court resin composition, there is obtained a gel court layer which is a little in reaction contraction in the molding course, low in viscosity in the working course with a gel court resin composition, and further, large in hardness, tough and excellent in weather resistance.

In a case where a polyurethane obtained from a reaction of the polyol component (1) containing the aforementioned polymer having hydroxyl groups at both terminals as an essential component with the polyfunctional isocyanate compound (e), and a polyester obtained from a reaction of the polyol component (1) containing the aforementioned polymer having hydroxyl groups at both terminals as an essential component with the compound (g) having two or more of a carboxyl group per one molecule are, respectively, used as an essential component of a thermoplastic elastomer, there can be obtained a thermoplastic elastomer which is superior in stretching, oil resistance, water resistance, weather resistance, chemical resistance and low temperature performance.

In a case where a polyurethane obtained from a reaction of the polyol component (1) containing the aforementioned polymer having hydroxyl groups at both terminals as an essential component with the polyfunctional isocyanate compound (e), and a polyester obtained from a reaction of the polyol component (1) containing the aforementioned polymer having hydroxyl groups at both terminals as an essential component with the compound (g) having two or more of a carboxyl group per one molecule are, respectively, used as an essential component of a molding material, there can be obtained a molding material which is superior in processing, hydrolysis resistance, weather resistance, chemical resistance and low temperature performance.

BEST MODE FOR CARRYING OUT THE INVENTION

Hereinafter, practical examples and comparative examples of the present invention are jointly explained, but the present invention is not limited to the examples described below. The "part" and "%" in the examples and comparative examples represent "part by weight" and "% by weight", respectively.

EXAMPLE 1

Into a flask equipped with a dropping funnel, stirrer, nitrogen-introducing tube, thermometer and reflux condenser was charged 153 parts of 2-hydroxyethyl disulfide [compound (a)], which was warmed at 100° C. with introducing nitrogen gas slowly. To this was added dropwise a solution of 1.64 parts of 2,2'-azobis(isobutyronitrile) (which is, hereinafter, is abridged to "AIBN") [the radical polymerization-initiator (c)] in 64 parts of butyl acrylate [the vinyl-based monomer (b)]

during 30 minutes, During the dropping, the polymerization temperature was maintained at 105°±5° C. When the dropping finished, the mole ratio [(a)/(c)] of the compound (a) to the initiator (c) was 100.

After the dropping finished, the polymerization reaction was completed by stirring the reaction mixture for further 30 minutes at the same temperature to obtain a dispersed solution of the polymer [1]. The polymerization percentage calculated from the concentration of a solid portion of this dispersed solution was 96%.

Then, this dispersed solution was transferred to a separatory funnel, to which 100 parts of toluene was added, and after well mixing with shaking, the solution was gently stood somewhile, an under layer obtained by separating the solution into two phases (2-hydroxyethyl disulfide) was removed and then, the toluene layer was washed by 200 parts of ion-exchanged water three times. To the washed toluene phase was added 50 parts of sodium sulfate and, after the toluene phase was treated with dehydration, toluene and residual monomers in the toluene phase were distilled off by an evaporator to purify the polymer [1].

The number average molecular weight (Mn) of the purified polymer [1] was 3,600 in a result of measuring by a vapor-pressure osmometry (VPO). Also, the average number of terminal hydroxyl groups of this polymer [1] [Fn(OH)] was 2.0 (mole/polymer 1 mole) in a calculation result on a basis of the OH value of 31 obtained according to JIS-K-1557 and the above-measured number average molecular weight.

EXAMPLES 2 TO 10

The procedure of example 1 was repeated except that the sorts and charged amounts of the compound (a), vinyl-based monomer (b) and radical polymerization-initiator (c) were as shown in Table 1 to 3 described below, a total amount of the compound (a) was charged at an initial stage, into which a solution of the radical polymerization-initiator (c) in the vinyl-based monomer (b) was added dropwise during 1 hour and, after this addition, stirring was continued at the same temperature for 1 hour to complete the polymerization reaction, whereby the polymers [2] to [10] were obtained.

Concerning the obtained polymers [2] to [10], the number average molecular weight was measured by a standard polystyrene conversion method using gel permeation chromatography (GPC) as well as the average number of terminal hydroxyl groups [Fn(OH)] was obtained by calculating on a basis of the OH value obtained according to JIS-K-1557 and the above-measured number average molecular weight. These results are shown in the under-described table 6 together with polymerization percents obtained similarly to the case of Example 1.

EXAMPLE 11

The procedure of example 5 was repeated except that the amount of 2-hydroxyethyl 2,2'-dithioglycolate charged as the compound (a) into a flask at an initial stage of the polymerization reaction was 30 parts and its residual 240 parts were added dropwise in the course of two hours together with the vinyl-based monomer (b) in which the initiator (c) was dissolved, whereby the polymer [11] was obtained.

Concerning the obtained polymer [11], the number average molecular weight was measured by a vapor-pressure osmometry (VPO) and also, the average number of terminal hydroxyl groups of this polymer [Fn(OH)] was determined by calculating on a basis of the OH value obtained according to JIS-K-1557 and the above-measured number average molecular weight. These results are shown in the underdescribed table 6 together with a polymerization percent obtained similarly to the case of Example 1.

EXAMPLE 12

The procedure of example 2 was repeated except that the sorts and used amounts of the compound (a), vinyl-based monomer (b) and radical polymerization-initiator (c) as well as an initially charged amount of the compound (a) and the polymerization temperature were as shown in Table 3 described below, whereby the polymer [12] was obtained.

Concerning the obtained polymer [12], the number average molecular weight was measured by a standard polystyrene conversion method using gel permeation chromatography (GPC) as well as the average number of terminal hydroxyl groups [Fn(OH)] was obtained by calculating on a basis of the OH value obtained according to JIS-K-1557 and the above-measured number average molecular weight. These results are shown in the under-described table 6 together with a polymerization percent obtained similarly to the case of Example 1.

EXAMPLES 13 TO 15

In a tube type reactor which was made by connecting five pieces of a reaction tube (inner diameter of 42.7 mm, length of 450 mm, element number of 12, made by SUS 304, and practical content of 190 ml) equipped with elements of a Sumitomo-Sulzer SMX type (made by Sulzer Co., Ltd.) and an outside jacket, there are mixed the compound (a), vinyl-based monomer (b) and initiator (c) in ratios shown in Tables 3 and 4, and this mixture was continuously supplied at a flow rate of 32 ml per minute using a plunger pump, a heating medium was run inside the jacket to stabilize an inner temperature at the polymerization temperatures shown in Tables 3 and 4, and thereby, a continuous polymerization reaction was carried out. The average residence time was 30 minutes. Then, the polymers [13] to [15] were obtained by purifying through a purification process similar to the example 1.

The number average molecular weight (Mn) of the purified polymers [13] to [15] was measured by a standard polystyrene conversion method using gel permeation chromatography (GPC) as well as the average number of terminal hydroxyl groups [Fn(OH)] was obtained by calculating on a basis of the OH value obtained according to JIS-K-1557 and the above-measured number average molecular weight. These results are shown in the under-described table 6 together with a polymerization percent obtained similarly to the case of Example 1.

EXAMPLE 16

The procedure of example 13 was repeated except that sorts and proportions of the compound (a), vinyl-based monomer (b) and radical polymerization initiator (c) as well as the polymerization temperature were as shown in Table 4 and, the vinyl-based monomer (b) and a 30% amount of the radical polymerization-initiator (c) were supplied at a flow rate of 6.4 ml per minute using a plunger pump from just before the third reaction tube, whereby the polymer [16] was obtained.

The number average molecular weight (Mn) of the purified polymer [16] was measured by a standard polystyrene conversion method using gel permeation chromatography (GPC) as we 11 as the average number of terminal hydroxyl groups [Fn(OH)] was obtained by calculating on a basis of the OH value obtained according to JIS-K-1557 and the above-measured number average molecular weight. These results are shown in the under-described table 6 together with a polymerization percent obtained similarly to the case of Example 1.

EXAMPLES 17 AND 18

A two-shaft extruder equipped with an outside jacket (inner diameter 1 inch, L/D=48, barrel number 8, screw SACM-made 645, shaft SNCM-made 439, others SACM-made 645) was furnished with openings for supplying a raw material and taking out a product and, in addition to these, another opening for supplying a raw material in the middle of the above openings. Into this extruder was continuously supplied a mixture prepared by mixing the compound (a), the vinyl-based monomer (b) and initiator (c) in the proportions shown in Table 4, at a flow rate of 20 ml per minute using a plunger pump, and shape and rotating number of the screw was determined so as to have an average residence time of about 30 minutes at a stationary state, and a heating medium was run in the jacket so as to stabilize the inner temperature at the polymerization temperatures shown in Table 4, in order to carry out a continuous polymerization reaction.

The number average molecular weight (Mn) of the purified polymers [17] and [18] was measured by a standard polystyrene conversion method using gel permeation chromatography (GPC) as well as the average number of terminal hydroxyl groups [Fn(OH)] was obtained by calculating on a bas is of the OH value obtained according to JIS-K-1557 and the above-measured number average molecular weight. These results are shown in the under-described table 7 together with a polymerization percent obtained similarly to the case of Example 1.

EXAMPLE 19

The procedure of example 17 was repeated except that sorts and proportions of the compound (a), vinyl-based monomer (b) and radical polymerization initiator (c) as well as the polymerization temperature were as shown in Table 4 and, a 50% amount of the vinyl-based monomer (b) and the radical polymerization-initiator (c) were continuously supplied at a flow rate of ml per minute using a plunger pump from the opening for supplying a material at the middle of an extruder, whereby the polymer [19] was obtained.

The number average molecular weight (Mn) of the purified polymer [19] was measured by a standard polystyrene conversion method using gel permeation chromatography (GPC) as well as the average number of terminal hydroxyl groups [Fn(OH)] was obtained by calculating on a basis of the OH value obtained according to JIS-K-1557 and the above-measured number average molecular weight. These results are shown in the under-described table 7 together with a polymerization percent obtained similarly to the case of Example 1.

EXAMPLES 20 TO 22

A KRC kneader equipped with an outside jacket (inner diameter 2 inch, L/D=13.2, effective inner volume 1.2 liter, made by Kurimoto Tekkosho Co., Ltd.) was furnished with openings for supplying a raw material and taking out a product. Into the kneader was continuously supplied a mixture of the compound (a), the vinyl-based monomer (b) and the initiator (c) having the proportions shown in Table 5at a flow rate of 20 ml per minute using a plunger pump, and the paddle-rotating number was adjusted at 20 rpm, and a heating medium was run in the jacket so as to have an average residence time of 30 minutes at a stationary state and to stabilize the inner temperature at the polymerization temperatures shown in Table 5, and a continuous polymerization reaction was carried out.

The number average molecular weight (Mn) of the purified polymers [20] to [22] was measured by a standard polystyrene conversion method using gel permeation chromatography (GPC) as well as the average number of terminal hydroxyl groups [Fn(OH)] was obtained by calculating on a basis of the OH value obtained according to JIS-K-1557 and the above-measured number average molecular weight. These results are shown in the under-described table 7 together with a polymerization percent obtained similarly to the case of Example 1.

EXAMPLE 23

The procedure of example 7 was repeated except that, as component other than the compound (a), vinyl-based monomer (b) and initiator (c), 20 parts of dioxane (3% by weight of the total) was charged together with the compound (a) into a flask at an initial stage, whereby the polymer [23] was obtained.

The number average molecular weight (Mn) of the purified polymer [23] was measured by a vapor pressure osmometry (VPO) as well as the average number of terminal hydroxyl groups [Fn(OH)] was obtained on a basis of the OH value obtained according to JIS-g-1557 and the above-measured number average molecular weight. These results are shown in the under-described table 7 together with a polymerization percent obtained similarly to the case of Example 1.

Comparative Example 1

The procedure of example 1 was repeated except that the amount of AIBN was 4.1 parts [compound (a) in charging formulation/initiator (c)=40 (mole ratio)], whereby the comparative polymer (1) was obtained.

From the residual percent of 2-hydroxyethyl disulfide determined by liquid chromatography and the residual percent of AIBN calculated from the decomposition rate of AIBN at the polymerization temperature in the present comparative example, it was confirmed that the mole ratio in the flask of the compound (a) to the initiator (c) [(a)/(c)] was lower than 50.

The number average molecular weight and average number of the terminal hydroxyl groups [Fn(OH)] of the obtained comparative polymer (1) were determined similarly to the case of example 1, and the results were 2,300 in number average molecular weight and 1.2 in average number of terminal hydroxyl groups [Fn(OH)].

Comparative Example 2

The procedure of example 14 was repeated except that the amount of AIBN was 32.8 parts [compound (a)/initiator (c)=5 (mole ratio)], whereby the comparative polymer (2) was obtained.

From the residual percent of 2-hydroxyethyl disulfide determined by liquid chromatography and the residual percent of AIBN calculated from the decomposition rate of AIBN at the polymerization temperature in the present comparative example, it was confirmed that the mole ratio in the flask of the compound (a) to the initiator (c) [(a)/(c)] was much lower than 50, almost throughout the polymerization reaction.

The number average molecular weight and average number of the terminal hydroxyl groups [Fn(OH)] of the obtained comparative polymer (2) were determined similarly to the case of example 1 and the results were 2,000 in number average molecular weight and 0.8 in average number of terminal hydroxyl groups [Fn(OH)].

Comparative Example 3

The procedure of example 18 was repeated except that the amount of AIBN was 32.8 parts [compound (a)/initiator (c)=5 (mole ratio)], whereby the comparative polymer (3) was obtained.

From the residual percent of 2-hydroxyethyl disulfide determined by liquid chromatography and the residual percent of AIBN calculated from the decomposition rate of AIBN at the polymerization temperature in the present comparative example, it was confirmed that the mole ratio in the flask of the compound (a) to the initiator (c) [(a)/(c)] was much lower than 50, almost throughout the polymerization reaction.

The number average molecular weight and average number of the terminal hydroxyl groups [Fn(OH)] of the obtained comparative polymer (3) were determined similarly to the case of example 1 and the results were 2,400 in number average molecular weight and 0.7 in average number of terminal hydroxyl groups [Fn(OH)].

Comparative Example 4

The procedure of example 1 was repeated except that, in addition to the compound (a), vinyl-based monomer (b) and initiator (c), 100 parts of dioxane was charged as a solvent together with the compound (a), vinyl-based monomer (b) and initiator (c) into a flask at an initial stage, whereby the comparative polymer (4) was obtained.

The number average molecular weight and average number of the terminal hydroxyl groups [Fn(OH)] of the obtained comparative polymer (4) were determined similarly to the case of example 1 and the results were 2,200 in number average molecular weight and 1.0 in average number of terminal hydroxyl groups [Fn(OH)].

Comparative Example 9

The procedure of example 14 was repeated except that, in addition to the compound (a), vinyl-based monomer (b) and initiator (c), 100 parts of dioxane was mixed as a solvent together with the compound (a), vinyl-based monomer (b) and initiator (c) at one time and the mixture thus-obtained was continuously supplied to a reaction vessel, whereby the comparative polymer (5) was obtained.

The number average molecular weight and average number of the terminal hydroxyl groups [Fn(OH)] of the obtained comparative polymer (5) were determined similarly to the case of example 1 and the results were 4,800 in number average molecular weight and 1.1 in average number of terminal hydroxyl groups [Fn(OH)].

EXAMPLE 24

The procedure of example 1 was repeated except that the amounts of 2-hydroxyethyl disulfide and AIBN were, respectively, 19.2 and 0.1 parts [compound (a)/vinyl-based monomer (b)=0.3 (weight ratio)], whereby the polymer [24] was obtained.

The number average molecular weight and average number of the terminal hydroxyl groups [Fn(OH)] of the obtained polymer [24] were determined similarly to the case of example 1 and the results were 23,000 in number average molecular weight and 1.3 in average number of terminal hydroxyl groups [Fn(OH)].

EXAMPLE 25

Into a flask equipped with a stirrer, nitrogen-introducing tube, thermometer, and reflux condenser were charged 100 parts of the polymer [1] obtained from the example 1, 8.8 parts of hexamethylene diisocyanate [NCO/OH=1.05 (mole ratio)], 200 parts of toluene and 0.1 part of dibutyltin dilaurate and the obtained mixture was stirred at 80° C. for 5 hours to complete reaction, whereby a toluene solution of the polyurethane [25] was obtained.

The number average molecular weight (Mn) of this polyurethane [25] was determined as 58,000 by a standard polystyrene conversion method using gel permeation chromatography (GPC).

EXAMPLE 26

The procedure of example 25 was repeated except that, instead of 100 parts of the polymer [1], 65 parts of the polymer [1] and 35 parts of the polymer [2] obtained from the example 2 were used and the amount of hexamethylene diisocyanate was changed into 8.5 parts, whereby a toluene solution of the polyurethane [26] was obtained.

The number average molecular weight (Mn) of this polyurethane [26] was determined as 48,000 by a standard polystyrene conversion method using gel permeation chromatography (GPC).

EXAMPLE 27

The procedure of example 25 was repeated except that, instead of 100 parts of the polymer [1], 50 parts of the polymer [1] and 50 parts of the polymer [2] obtained form the example 2 were used, whereby a toluene solution of the polyurethane [27] was obtained.

The number average molecular weight (Mn) of this polyurethane [27] was determined as 28,000 by a standard polystyrene conversion method using gel permeation chromatography (GPC).

EXAMPLE 28

The procedure of example 27 was repeated except that, instead of 50 parts of the polymer [2], 37 parts of the polymer [3] obtained form the example 3 was used, whereby a toluene solution of the polyurethane [28] was obtained.

The number average molecular weight (Mn) of this polyurethane [28] was determined as 31,000 by a standard polystyrene conversion method using gel permeation chromatography (GPC).

EXAMPLE 29

The procedure of example 25 was repeated except that, instead of 100 parts of the polymer [1], 70 parts of the polymer [1] and 0.51 parts of 1,4-butanediol were used, whereby a toluene solution of the polyurethane [29] was obtained.

The number average molecular weight (Mn) of this polyurethane [29] was determined as 41,000 by a standard polystyrene conversion method using gel permeation chromatography (GPC).

EXAMPLE 30

Into a flask equipped with a stirrer, nitrogen-introducing tube, thermometer, dropping funnel and reflux condenser were charged 100 parts of methyl ethyl ketone and 2.0 parts of hexamethylene diisocyanate and, to the mixture which was warmed up to a temperature (about 80° C.) where refluxing began, a solution of 60 parts of VYLON GK 130 (a polyester diol, made by Toyo Boseki Co., Ltd., Mn=6,000) and 0.1 part of dibutyltin dilaurate in 200 parts of methyl ethyl ketone was added dropwise during 1 hour and the obtained mixture was further stirred at the same temperature for 3 hours to complete reaction, whereby a methyl ethyl ketone solution of a polyester having isocyanate groups at both terminals was obtained.

Next, to the flask was added dropwise a solution of 22 parts of the polymer [2] obtained from the example 2 and 0.1 part of dibutyltin dilaurate in 100 parts of methyl ethyl ketone during 1 hour, and the thus-obtained mixture was stirred at the same temperature for 3 hours to complete reaction, whereby a methyl ethyl ketone solution of the polyurethane [30] was obtained.

The number average molecular weight (Mn) of this polyurethane [30] was determined as 12,000 by a standard polystyrene conversion method using gel permeation chromatography (GPC).

Judging from this number average molecular weight, it is considered that a segment block type polyurethane of an ABA type having the polymer [2] of this invention as an A component and the VYLON GK 130 as a B component was formed.

EXAMPLE 31

Into a flask equipped with a stirrer, nitrogen-introducing tube, thermometer, dropping funnel and reflux condenser were charged 100 parts of toluene and 3.5 parts of hexamethylene diisocyanate and, to the mixture which was warmed up to 80° C., a solution of 46 parts of the polymer [2] obtained from the example 2 and 0.1 part of dibutyltin dilaurate in 100 parts of toluene was added dropwise during 1 hour and the obtained mixture was further stirred at the same temperature for 3 hours to complete reaction, whereby toluene solution of a polymer having isocyanate groups at both terminals was obtained.

Next, to the flask was added dropwise a solution of 40 parts of the polymer [1] obtained from the example 1 and 0.1 part of dibutyltin dilaurate in 100 parts of toluene during 1 hour, and the thus-obtained mixture was further stirred at the same temperature for 3 hours to complete reaction, whereby a toluene solution of the polyurethane[31] was obtained.

The number average molecular weight (Mn) of this polyurethane [31] was determined as 38,000 by a standard polystyrene conversion method using gel permeation chromatography (GPC).

EXAMPLE 32

Into a flask equipped with a stirrer, thermometer, azeotropic dehydration tube and reflux condenser were charged 100 parts of the polymer [1] obtained from the example 1, 7.4 parts of phthalic anhydride and 5 parts of xylene, and the obtained mixture was sufficiently stirred and warmed at 100° C. for 2 hours to carry out reaction with dehydration through the azeotropic dehydration tube, then the reaction was carried out at 160° C. for further 2 hours and, finally, at 220° C. for 1 hour, whereby the polyester was obtained.

The number average molecular weight (Mn) of this polyester [32] was determined as 32,000 by a standard polystyrene conversion method using gel permeation chromatography (GPC).

EXAMPLE 33

The procedure of example 32 was repeated except that, instead of 100 parts of the polymer [1], 65 parts of the polymer [1] and 35 parts of the polymer 2] obtained from the example 2 were used and the amount of phthalic anhydride was changed to 7.1 parts, whereby the polyester [33] was obtained.

The number average molecular weight (Mn) of this polyester [33] was determined as 30,000 by a standard polystyrene conversion method using gel permeation chromatography (GPC).

EXAMPLE 34

The procedure of example 32 was repeated except that, instead of 100 parts of the polymer [1], 50 parts of the polymer [1] and 50 parts of the polymer [2] obtained from the example 2 were used, whereby the polyester [34] was obtained.

The number average molecular weight (Mn) of this polyester [34] was determined as 28,000 by a standard polystyrene conversion method using gel permeation chromatography (GPC).

EXAMPLE 35

The procedure of example 32 was repeated except that, instead of 100 parts of the polymer [1], 65 parts of the polymer [1] and 1.6 parts of 1,4-butanediol were used, whereby the polyester [35] was obtained.

The number average molecular weight (Mn) of this polyester [35] was determined as 35,000 by a standard polystyrene conversion method using gel permeation chromatography (GPC).

EXAMPLE 36

With 100 parts of a resin for an acrylic primer having composition (% by weight) of 35 for ethyl acrylate, 35 for styrene, 12 for butyl acrylate, 8 for methacrylic acid, 6 for 2-hydroxyethyl acrylate, and 3 for methyl methacrylate, and having a number average molecular weight of 15,000, a hydroxyl group value of 36 and an acid value of 50, there were well mixed 30 parts of Cymel 325 (made by Mitsui Cyanamide Co., Ltd.) as an alkyl ether-aminoformaldehyde resin, 0.25 as a curing parts of p-toluenesulfonic acid accelerator, 30 parts of zinc chromate as an antirust pigment, 400 parts of cyclohexanone as a solvent and 50 parts of acid value titanium, and the obtained mixture was coated by a bar coater on a zinc-plated steel plate of 0.5 mm thickness chromate-processed beforehand, and the coated plate was baked at 220° C. for 1 minute.

Then, a mixture was prepared with well stirring and mixing, using a paint shaker, 100 parts of the polymer [12] obtained from the example 12, 30 parts of Cymel 325 (made by Mitsui Cyanamide Co., Ltd.) as an alkyl-etherated aminoformaldehyde resin, 0.25 parts of p-toluenesulfonic acid as a curing accelerator, 125 parts of titanium oxide, 0.5 parts of a leveling agent MK conc (made by Kyouei Yushi Kagaku Kogyo Co., Ltd.) and 400 parts of cyclohexanone. This mixture was coated by a bar coater on the primer paint film cooled after the aforementioned baking so as to make a film having 25μ thickness in a dried state and, after setting at 70° C. for 10 minutes, a coated steel sheet was made by baking at 235° C. for 60 seconds. Concerning this paint film, the coin scratching performance was evaluated by the following (1) method.

Further, a mixture was prepared by well stirring and mixing, using a paint shaker, 100 parts of the polymer [12] obtained from the example 12, 30 parts of Cymel 325 (made by Mitsui Cyanamide Co., Ltd.) as an alkyl-etherated aminoformaldehyde resin, 0.25 parts of p-toluenesulfonic acid as a curing accelerator, 125 parts of titanium oxide, 0.5 parts of a leveling agent MK cone (made by Kyouei Yushi Kagaku Kogyo Co., Ltd.) and 400 parts of cyclohexanone. Without using the aforementioned resin for an acrylic primer, this mixture was coated by a bar coater on a zinc-plated steel sheet of 0.5 mm thickness processed by a chromate directly beforehand so as to make a film having 25μ thickness in a dried state and, after setting at 70° C. for 10 minutes, a coated steel sheet was made by baking at 235° C. for 60 seconds. Concerning this paint film, the following (2) to (6) evaluations were carried out.

(1) Coin scratching

The film on a coated steel, after being strongly scratched using a 10 yen coin, was evaluated about the paint film condition by the naked eye.

⊚—not peeled off from the primer base (steel sheet), adhesion between the primer layer and the finish coat layer was excellent, and only the finish coat cohered and was destroyed.

○—the primer slightly peeled off from the base, but adhesion between the primer layer and the finish coat layer was excellent.

△—the primer did not peel off from the base, but adhesion between the primer layer and the finish coat layer was bad, and the finish coat layer easily peeled off from between layers.

×—the finish coat together with the primer peeled off from the base, and adhesion of the primer to the base is insufficient.

××—the finish coat together with the primer very much peeled off from the base.

(2) Processing (T bent)

When a coated steel sheet was bent from 180° 4T to 0T in sequence, cracks occurring in the bent part were observed by a 15 times loupe for judgment. For example, in a case where occurrence of cracks was observed by putting three sheets of copper plates between bending parts followed by bending, in which each copper plate has a thickness same as that of the steel sheet, the processing is said as T bent 3T and, accordingly, if the number of T bent is smaller, the processing is better.

(3) Adhesion

A peeling test by a checkerboard and crosscut squares was carried out according to JIS D-0202.

(4) Hot water resistance test

A coated steel sheet was immersed in ion-exchanged water and taken out after boiling for 8 hours, and the film was judged by observation.

○—no blister and adhesion 100/100
△—blisters occur.
×—blisters much occur.

(5) Corrosion resistance

A coated steel sheet was crosscut by a cutter knife and, according to JIS-K-5400, a salt spray test was carried out for 500 hours and then, the crosscut part was subjected to the cellophane tape-peeling to evaluate the corrosion resistance by the peeling width.

(6) Pencile hardness

This was carried out using a Mitsubishi Uni pencil, according to JIS K-5400.

Test results are summarized in Table 8.

It was found that a top coat, in which the polymer having hydroxyl groups at both terminals obtained from the production process of this invention was used, is superior in adhesion and hard to get injured as well as superior in softness and processing and also, in boiling water resistance and corrosion resistance.

Comparative Examples 6 and 7

The procedure of example 36 was repeated except that the polymer [12] used as the coating for finish coat was as shown in Table 8, whereby coated steel sheets for comparison were prepared. Test results of these paint films are summarized in Table 8.

EXAMPLE 37

With 100 parts of the polymer [17] obtained from the example 17 was combined 5 parts of a matter (Colonate L, made by Nippon Polyurethane Co., Ltd.; hereinafter, referred to as "Colonate L") made by adding 3 equivalents of tolylene diisocyanate to trimethylolpropane, and this combination was diluted by ethyl acetate to make a 20% adhesive solution. A matter to be adhered were a polyethylene terephthalate film of 12μ thickness (hereinafter, referred to as "PET") and a unstretched polypropylene film of 50μ thickness (hereinafter, referred to as "CPP") processed by corona discharge. To laminate these films, the adhesive solution was coated on both the films by a dry laminator so as to have a solid portion of 3.0 g/m$^2$ and, after evaporating the solvent, the films were stacked together. At this time, the wetting property of the adhesive solution was investigated. The laminated films obtained were cut to make a test specimen of 15 mm width, which was subjected to a stretching test machine for carrying out a T type peeling test by 300 mm/minute, so that an adhesive strength at an initial stage was determined. Additionally, a test specimen was made from the laminated films which were, after stacked together, obtained by hardening at 50° C. for 3 days. Of this test specimen, adhesive strength under ordinary conditions, hot water resistance, chemical resistance and softness were evaluated according to the following methods. The results obtained are shown in Table 9.

(1) Adhesive strength under ordinary conditions

A T type peeling test machine similar to the determination of an adhesive strength at an initial stage was carried out.

(2) Tests of hot water resistance and chemical resistance

In the test of hot water resistance, a test specimen was placed with water in a 50 cc autoclave, treated at 120° C. for 5 hours, and subjected to the T type peeling test to examine the peeling condition and strength. In the test of chemical resistance, a test specimen was immersed in a 4% aqueous acetic acid solution at 25° C. for 4 hours, which was then subjected to the T type peeling test.

(3) Softness

The softness was evaluated by the peeling manner in aforementioned peeling tests. In the table, meaning of the marks are as follows.

○—peeling strength was large and peeling occurs slowly but steadily, so that uniform strength was indicated.

Δ—the strength was partly large, but some parts were simply peeled.

×—simply peeled at a stroke and the strength was small.

(4) Wetting property (observation results)

○—uniform coating was possible.

Δ—partly sprung out.

×—sprung out.

When an adhesive composition of using the polymer having hydroxyl groups at both terminals obtained from the production process of this invention is used as an adhesive for laminates, the adhesive strength at an initial stage and ordinary conditions was not only strong, but also very superior in hot water resistance, chemical resistance and softness.

Comparative Examples 8 and 9

The procedure of example 37 was repeated except that, instead of the polymer [17], the polymers shown in Table 9 were used, whereby the test specimens of laminated films for comparison were obtained. Evaluation results of the test specimens in adhesive strength under ordinary conditions, hot water resistance, chemical resistance and softness are shown in Table 9.

EXAMPLE 38

To 35 parts of the polymer 16] obtained from the example 16 were added 35 parts of ethyl acetate, 30 parts of toluene and Colonate L (an isocyanate compound, made by Nippon Polyurethane Co., Ltd.), and the obtained mixture was, after well stirring, coated on a PET film of 25μ thickness so as to have 25μ thickness after drying, and then, the coated PET film was dried at 100° C. for 3 minutes to obtain a pressure sensitive adhesive sheet.

Concerning this pressure sensitive adhesive sheet, the tacky strength, tackiness at an initial stage (probe tackiness) and tackiness-holding strength were measured at temperatures of 23° C. and 5° C. according to the undermentioned methods, and the results shown in Table 10 were obtained.

Tacky strength:

In an atmosphere of 23° C. temperature and 65% humidity and in an atmosphere of 5° C. temperature, a pressure sensitive adhesive sheet (25 mm width) to be tested was pasted together by going and returning one time of a 2 kg rubber roller on a polyethylene plate. When the pressure sensitive adhesive sheet was, after 25 minutes, peeled off toward a 180° direction at a rate of 300 mm per minute, the resistant value was measured.

Tackiness at initial stage:

In an atmosphere of 23° C. temperature and 65% humidity and in an atmosphere of 5° C. temperature, pressure sensitive adhesive sheet to be tested was set on a probe up tackiness-testing machine (made by Nichiban Co., Ltd.). When the pressure sensitive adhesive sheet was peeled off with a contact time of 1 second and at a rate of 1 cm per second, the resistant value was measured.

Tackiness-holding strength:

A pressure sensitive adhesive sheet to be tested was pasted with an area of 25 mm×25 mm on a stainless steel sheet (SUS 304) and, after 20 minutes, was burdened at 80° C. by a 1 kg load, and there was determined a time until dropping of this load.

A pressure sensitive adhesive composition, in which the polymer having hydroxyl groups at both terminals obtained from the production process of this invention was used, are not only excellent in tacky strength at ordinary temperature, probe tackiness and tackiness-holding strength, but also particularly excellent in tacky strength at a low temperature and probe tackiness.

EXAMPLE 39

A pressure sensitive adhesive sheet was obtained by repeating the procedure of example 38, except using the polymer [7] obtained from the example 7 instead of 35 parts of the polymer [16].

Concerning this pressure sensitive adhesive sheet, the tacky strength, tackiness at an initial stage and tackiness-holding strength were measured at temperatures of 23° C. and 5° C. according to the aforementioned methods, and the results shown in Table 10 were obtained.

Comparative Example 10

A pressure sensitive adhesive sheet for comparison was obtained by repeating the procedure of example 38, except using the polymer shown in Table 10 instead of 35 parts of the polymer [16].

Concerning this pressure sensitive adhesive sheet for comparison, the tacky strength, tackiness at an initial stage and tackiness-holding strength were measured at temperatures of 23° C. and 5° C. according to the aforementioned methods, and the results shown in Table 10 were obtained.

EXAMPLE 40

To 100 parts of the polymer [13] obtained from the example 13 were added, with stirring by a kneader, 100 parts of calcium carbonate, 15 parts of titanium dioxide, 20 parts of calcium oxide, 2 parts of Disperon 3600N (made by Kusumoto Kasei Co., Ltd.), 0.5 parts of dibutyltin dilaurate and 0.2 parts of carbon black and then, added 9.5 parts of hexamethylene diisocyanate, and an elastic sealant was obtained by well stirring the above mixture at 80° C. for 3 hours. Concerning this elastic sealant, property evaluation according to JIS-A5757 and the undermentioned weather resistance test were carried out and the results shown in Table 11 were obtained.

(1) Weather resistance test

In a sunshine weather meter and under conditions of 63° C. atmosphere temperature, irradiating ultraviolet radiation, one cycle 2 hours, rainfall for 18 minutes in one cycle, a test specimen (dumb-bell) prepared beforehand was stood in a calm condition and, after 160 hours, this specimen dumb-bell) was taken out to measure its stretch-preserving percentage (%). The stretch-preserving percentage (%) was determined by a ratio of the maximum stretching before and after the weather resistance test and the results obtained are shown in Table 11.

The elastic sealant composition, in which the polymer having hydroxyl groups at both terminals obtained from the production process of this invention was used, is not only superior in a stretch under ordinary conditions, but also very superior in weather resistance.

EXAMPLE 41

An elastic sealant was obtained by repeating the procedure of example 40, except using the polymer [5] obtained from the example 5 instead of the polymer [13]. Concerning this elastic sealant, property evaluation was carried out according to JIS-A5757 and the results shown in Table 11 were obtained.

Comparative Examples 11 to 13

An elastic sealant for comparison was obtained by repeating the procedure of example 40, except using the polymer shown in Table 11 instead of the polymer [13]. Concerning this elastic sealant for comparison, property evaluation was carried out according to JIS-A5757 and the results shown in Table 11 were obtained.

EXAMPLE 42

A mixture of 700 parts of the polymer [1] obtained from the example 1 and 6.1 parts of trimethylolpropane was dried by heating at 70° C. for 2 hours under a reduced pressure of 2 Torr. To this polyol mixture dried and degassed was added 365 parts of Isonate 143-L (made by Upjoin Polymer Chemicals) (an isocyanate, 2.56 milli equivalent per gram) and the obtained mixture was maintained at 70° C. for 70 minutes to complete reaction. The product was an almost colorless liquid having an isocyanate content of 2.2 milli equivalent per gram and a viscosity of 20,000 cps at 25° C. After a sample was preserved at 80° C. for 2 weeks, this product was enriched in viscosity up to 35,000 cps at 25° C. By strongly stirring 80 g of the product warmed at 35° C. with 100 ml of a 2% aqueous solution of Pluronic L-62, that is a nonionic surfactant made by Wyandotte, a soft type urethan foam which is soft and pliant was obtained. Properties of this urethan foam are shown in Table 12.

Comparative Examples 14 to 16

The soft type urethan foam for comparison was obtained by repeating the procedure of example 42, except using the sort and amount of polymers shown in Table 12 instead of 700 parts of the polymer [1]. Properties of the urethane foam were shown in Table 12.

EXAMPLE 43

(Synthesis of polymer having polymerizable unsaturated groups at both terminals)

Into a flask equipped with a stirrer, reflux condenser, thermometer were charged 100 parts of the polymer [21], 5.6 parts of maleic anhydride, 0.1 part of dibutyltin oxide, 0.1 part of hydroquinone and 200 parts of toluene, and the mixture was stirred at 100° C. for 5 hours to carry out reaction and then, the solvent toluene was removed by an evaporator and a desiccator under a reduced pressure, whereby the polymer [43] was obtained.

EXAMPLE 44

(Synthesis of polymer having polymerizable unsaturated groups at both terminals and on side chain)

Into a flask equipped with a stirrer, reflux condenser, thermometer were charged 100 parts of the polymer [22] obtained from the example 22, 11 parts of 2-isocyanatoethyl methacrylate, 0.1 part of dibutyltin dilaurate, 0.1 part of hydroquinone and 200 parts of toluene, and the mixture was stirred at 80° C. for 5 hours to carry out reaction and then, the solvent toluene was removed by an evaporator and a desiccator under a reduced pressure, whereby the polymer [44] was obtained.

EXAMPLES 45 TO 49

A gel court composition was prepared by using the polymers [43] and [44] obtained from the examples 43 and 44 with the compounds to be combined and amounts shown in Table 13. To 100 parts of this gel court composition were added and well mixed 2.5 parts of Aerosil #200 (a thixotropic agent, made by Nippon Aerosil Co., Ltd.), 0.015 parts as a metal component of cobalt naphthenate, and 1.0 part of 55% methyl ethyl ketone peroxide (Permeric N, made by Nippon Yushi Co., Ltd.), and this mixture was coated on glass plates at an air pressure of 3.0 Kg/cm$^2$ by using a spray gun of 3.0 caliber so as to make a coated film thickness of from 0.2 to 0.3 mm. Next, these coated plates were hardened at 60° C. for 2 hours, stood for cooling to room temperature, and on the obtained coated films there were molded and hardened glass fiber-reinforced plastic layers by using a unsaturated polyester resin and glass fiber. Then, the moldings were released from the glass plates to obtain moldings having gel court resin layers.

Coated film properties and weather resistance of the gel court resin layers of these moldings were measured as follows, and the obtained results were summarized in Table 13.

The gel court resin composition of this invention does not cause any sagging when being coated on various kinds of moldings, and it was found that the composition forms a gel court layer which is not only low in viscosity and good in working efficiency, but also high in hardness and excellent in weather resistance.

(1) Viscosity, thixotropy and gel time

The tests were carried out according to the JIS 6901 liquid type unsaturated polyester resin test.

(2) Film-forming character

This was judged the outside appearance (cissing) in spray coating by the naked eye.

(3) Pencil hardness

The test was carried out according to JIS K-5400, using a Mitsubishi Uni Pencil.

(4) Weather resistance (blister-generating time)

Using a sunshine weather meter (made by Suga Shikenki Co., Ltd.), a sample molding was stood for 1,000 hours under conditions of an atmosphere temperature of 65° C., a spray cycle of 18 minutes/120 minutes, and a light source of arc carbon, whereby the 60° gloss-holding percentage of surface gel court layers was shown.

EXAMPLE 50

Evaluation tests about the following thermoplastic elastomer were carried out for the polyurethane [26] obtained from the example 26. The results were summarized in Table 14.

(1) Pull and stretch test

This was carried out according to JIS K 6301, using No. 3 dumb-bell (2) Oil resistance test A polymer was immersed in a JIS #3 oil at 100° C. for 70 hours, and there was determined a volume change percentage (%) of the polymer between after-immersing and before this test.

(3) Heather resistance test

Using a sunshine weather meter and under conditions of an atmosphere temperature 63° C., UV rays irradiation, one cycle 2 hours, a rainfall for 18 minutes during one cycle, there was stood a dumb-bell which was melted and casted at 200° C. and molded. After 24 hours and 330 hours, this dumb-bell was taken out and its stretch-preserving percentage (%) was determined. The stretch-preserving percentage was obtained by measuring the pull-stretch in breaking according to JIS K 6301 followed by determining the ratio between before and after the weather resistance test.

(4) Chemical resistance test

This was carried out according to JIS K 6301 using a No. 3 dumb-bell. A polymer was immersed in a 40% aqueous sodium hydroxide solution and each solvent at 23° C. for 5 days and then, it was taken out and its surface was observed. The chemical resistance was evaluated by the following A to D standards from the observed surface conditions.

A: no change at all.
B: a 1 most no change.
C: the surface slightly swelled.
D: swelled and was fragile.

The thermoplastic elastomer in which a polyurethane and polyester of this invention were used is not only large in stretching at ordinary conditions, but also very superior in oil resistance, weather resistance, chemical resistance and so forth.

EXAMPLE 51

The evaluation of example 50 was repeated by using the polyurethane [31] obtained from the example 31 instead of the polyurethane [26] obtained from the example 26. Results obtained are shown in Table 14.

EXAMPLE 52

The evaluation of example 50 was repeated by using the polyurethane [33] obtained from the example 33 instead of the polyurethane [26] obtained from the example 26. Results obtained are shown in Table 14.

Comparative Examples 17 and 18

The procedure of example 50 was repeated except that a polymer shown in Table 14 was used instead of the polyurethane [26] obtained from the example 26, and the obtained comparative polymers were subjected to evaluation tests about the thermoplastic elastomer. Results are shown in Table 14.

EXAMPLES 53 AND 54

The polyurethane [27] obtained from the example 27 and the polyester [34] obtained from the example 34 were subjected to the undermentioned evaluation tests about the molding material. Results are summarized in Table 15.

(1) Molding processing

Temperature dependence of the melt fluidity performance of a polyurethane and polyester was determined by using a raising type flow tester (hold 185° C.×5 minutes, rising temperature 5° C./minute, dice diameter×length=0.5 mm$\phi$×5 mm, and load 20 Kg), measuring the viscosity according to a rising temperature method, determining the activation energy Ea (Kcal/mol) of apparent melt fluidity by plotting the logarithmic value of a flow rate ratio which is in a correlation with an absolute temperature against the reciprocal of the absolute temperature, determining the slope g of a line obtained by the plotting, and calculating according to the following equation.

$Ea = -2.303 \cdot R \cdot K$ (here, R is the gas constant, 1.987 cal/deg·mol)

(2) Low temperature characteristic

The low temperature characteristic was evaluated by pressing an obtained polyurethane (or polyester) pellet by a pressure of 10 kg/cm$^2$ at 25° C. for 2 minutes to prepare a film of 100$\mu$, and measuring the main dispersion peak temperature (Ta) by a dynamic tackiness and elasticity automatic measurement device (110 Hz).

(3) Hydrolysis resistance

This was evaluated by a jungle test. This test was evaluated by leaving a polyurethane (or polyester) film of 50$\mu$ thickness at 70° C. for 30 days under a 95% relative humidity and measuring the tensile strength-holding percentage of the film before and after the jungle test.

(4) Weather resistance

In a weather meter, an atmosphere condition and humidity were set at 40° C. and 68%, respectively. A polyurethane (or an ester) film of 50$\mu$ thickness was irradiated with a light and, after 7 days, the polyurethane (or an ester) film was taken out and its tensile strength-holding percentage (%) before and after the weather resistance was measured.

The molding material in which a polyurethane and polyester of this invention were used has an excellent molding processing performance and it is not only superior in the low temperature characteristic, but also very superior in hydrolysis resistance and weather resistance.

Comparative Examples 19 and 20

Similar to the case of example 53, the polymers shown in Table 15, instead of the polyurethane [27] obtained from the example 27, were subjected to the undermentioned evaluation tests about the molding material. Results are summarized in Table 15.

TABLE 1

| Example | Compound (a) kind | amount for use (part) | Vinyl-basedmonomer (b) kind | amount for use (part) | Initiator (c) kind | amount for use (part) | Polymerization apparatus | Polymerization procedure |
|---|---|---|---|---|---|---|---|---|
| 1 | 2-hydroxyethyl disulfide | 306 | butyl acrylate | 64 | AIBN | 1.6 | flask batch polymerization | (a) the total amount was charged at initial stage (b) and (c) were dropped at 100 ± 5° C. during 30 min and further, stirred at the same temperature for 30 min |
| 2 | 2-hydroxyethyl disulfide 2-hydroxyethyl trisulfide | 214 111 | methyl methacrylate | 50 | ↑ | ↑ | ↑ | (a) the total amount was charged at initial stage (b) and (c) were dropped at 100 ± 5° C. during 1 hour and further, stirred at the same temperature for 1 hour |
| 3 | 2-hydroxyethyl disulfide 2-hydroxyethyl trisulfide 2-hydroxyethyl | 92 65 11 | cyclohexyl methacrylate | 108 | 1,1'-azobis (cyclohexane-1-carbonitrile) | 2.4 | ↑ | (a) the total amount was charged at initial stage (b) and (c) were dropped at 110 ± 5° C. during 1 hour and further, |

TABLE 1-continued

| | Compound (a) | | Vinyl-basedmonomer (b) | | Initiator (c) | | | |
|---|---|---|---|---|---|---|---|---|
| Example | kind | amount for use (part) | kind | amount for use (part) | kind | amount for use (part) | Polymerization apparatus | Polymerization procedure |
| | tetrasulfide | | | | | | | stirred at the same temperature for 1 hour |
| 4 | 2-hydroxyethyl disulfide | 153 | methyl methacrylate | 36 | benzoyl peroxide | 3.6 | ↑ | (a) the total amount was charged at initial stage |
| | | | butyl acrylate | 27 | | | | (b) and (c) were dropped at 110 ± 5° C. were dropped min and further, stirred at the same temperature for 30 min |
| | | | acrylic acid | 2 | | | | |

Footnote:
the upward arrow denotes the same as just the above column.

TABLE 2

| | Compound (a) | | Vinyl-basedmonomer (b) | | Initiator (c) | | | |
|---|---|---|---|---|---|---|---|---|
| Example | kind | amount for use (part) | kind | amount for use (part) | kind | amount for use (part) | Polymerization apparatus | Polymerization procedure |
| 5 | di(2-hydroxyethyl)2,2'-dithiodiglycolate | 270 | 2-ethylhexyl acrylate | 110 | lauroyl peroxide | 8.0 | flask batch polymerization | (a) the total amount was charged at initial stage |
| | | | styrene | 36 | | | | (b) and (c) were dropped at 100 ± 5° C. during 2 hour and further, stirred at the same temperature for 1 hour |
| | | | acrylonitrile | 3 | | | | |
| 6 | ↑ | ↑ | methyl methacrylate | 60 | 2,2'-azobis(2,4-dimethylvaleronitrile) | 2.5 | ↑ | (a) the total amount was charged at initial stage |
| | | | phenyl-maleimide | 95 | | | | (b) and (c) were dropped at 90 ± 5° C. during 1 hour and further, stirred at the same temperature for 1 hour |
| 7 | di(2-hydroxyethyl)2,2'-dithiodibenzoate | 394 | butyl acrylate | 205 | tert.-butyl peroxypivalate | 1.7 | ↑ | (a) the total amount was charge at initial stage |
| | | | vinyl acetate | 34 | | | | (b) and (c) were dropped at 75 ± 5° C. during 2 hour and further, stirred at the same temperature for 2 hour |
| 8 | 2-dihydroxyethyl disulfide | 153 | methacrylic acid | 232 | 2,2'-azobis[2-(5-methyl-2-imidazolin-2-yl) propane]hydrochloride | 1.8 | ↑ | (a) the total amount was charged at initial stage |
| | | | acrylamide | 21 | | | | (b) and (c) were dropped at 60 ± 5° C. during 2 hour and further, stirred at the same temperature for 1 hour |

Footnote:
the upward arrow denotes the same as just the above column.

TABLE 3

| | Compound (a) | | Vinyl-basedmonomer (b) | | Initiator (c) | | | |
|---|---|---|---|---|---|---|---|---|
| Example | kind | amount for use (part) | kind | amount for use (part) | kind | amount for use (part) | Polymerization apparatus | Polymerization procedure |
| 9 | 2-hydroxyethyl disulfide | 153 | methyl methacrylate | 120 | AIBN | 1.6 | flask batch polymerization | (a) the total amount was charged at initial stage |
| | | | butyl acrylate | 95 | | | | (b) and (c) were dropped at 100 ± 5° C. during 1 hour and further, stirred at the same temperature for 30 min |
| | | | 2-hydroxyethyl methacrylate | 7 | | | | |
| 10 | 2-hydroxyethyl disulfide | 214 | styrene | 104 | ↑ | ↑ | ↑ | (a) the total amount was charged at initial stage |
| | 2-hydroxyethyl trisulfide | 111 | | | | | | (b) and (c) were dropped at 100 ± 5° C. during 1 hour and further, stirred at the same temperature for 1 hour |
| 11 | di(2-hydroxyethyl)2,2'-dithiodiglycolate | 270 | 2-ethylhexyl acrylate | 110 | lauroyl peroxide | 8.0 | ↑ | 11% of (a) was charged at initial stage |
| | | | styrene | 36 | | | | (b) and (c) were dropped at 100 ± 5° C. during 2 hour and further, |
| | | | acrylonitrile | 3 | | | | |

TABLE 3-continued

| Example | Compound (a) kind | amount for use (part) | Vinyl-basedmonomer (b) kind | amount for use (part) | Initiator (c) kind | amount for use (part) | Polymerization apparatus | Polymerization procedure |
|---|---|---|---|---|---|---|---|---|
| 12 | 2-hydroxyethyl disulfide | 306 | butyl acrylate | 42 | benzoyl peroxide | 3.6 | ↑ | stirred at the same temperature for 1 hour 10% of (a) was charged at initial stage (b) and (c) were dropped at 110 ± 5° C. during 1 hour and further, stirred at the same temperature for 1 hour |
|  |  |  | methyl methacrylate | 28 |  |  |  |  |
|  |  |  | acrylic acid | 2 |  |  |  |  |
| 13 | di(2-hydroxy-ethyl)2,2'-dithio-diglycolate | 270 | ethyl acrylate | 50 | 1,1'-azobis (cyclohexane-1-carbonitrile) | 2.4 | tube type reactor | mixture was supplied at 110 ± 5° C. at one time and residence time was 30 min |

Footnote:
the upward arrow denotes the same as just the above column.

TABLE 4

| Example | Compound (a) kind | amount for use (part) | Vinyl-basedmonomer (b) kind | amount for use (part) | Initiator (c) kind | amount for use (part) | Polymerization apparatus | Polymerization procedure |
|---|---|---|---|---|---|---|---|---|
| 14 | 2-hydroxyethyl disulfide | 153 | 2-ethylhexyl acrylate | 110 | AIBN | 1.6 | tube type reactor | mixture was supplied at 100 ± 5° C. at one time and residence time was 30 min |
|  |  |  | styrene | 36 |  |  |  |  |
|  |  |  | acrylonitrile | 3 |  |  |  |  |
| 15 | ↑ | ↑ | methacrylic acid | 39 | 2,2'-azobis[2-(5-methyl-2-imidazolin-2-yl)propane] | 1.8 | ↑ | mixture was supplied at 60 ± 5° C. at one time and residence time out 30 min |
|  |  |  | acrylamide | 4 |  |  |  |  |
| 16 | di(2-hydroxy-2,2'-dithio-dibenzonate | 50 | 2-ethylhexyl acrylate | 45 | lauroyl peroxide | 0.5 | ↑ | 30% of (b) and (c) was supplied at 100 ± 5° C. on the way and residence time was 30 min |
|  |  |  | butyl acrylate | 45 |  |  |  |  |
|  |  |  | vinyl acetate | 6 |  |  |  |  |
|  |  |  | acrylic acid | 4 |  |  |  |  |
| 17 | 2-hydroxyethyl disulfide | 77 | butyl acrylate | 55 | 2,2'-azobis(2,4-dimethylvalero- | 1.3 | two shaft extruder | mixture was supplied at 90 ± 5° C. at one time and residence time was 30 min |
|  |  |  | acrylonitrile | 19 |  |  |  |  |
|  |  |  | methyl methacrylate | 9 |  |  |  |  |
|  |  |  | acrylic acid | 2 |  |  |  |  |
| 18 | ↑ | 153 | cyclohexyl methacrylate | 108 | AIBN | 0.8 | ↑ | mixture was supplied at 100 ± 5° C. at one time and residence time was 30 min |
| 19 | ↑ | 77 | methyl methacrylate | 60 | tert.-butyl peroxypivalate | 1.7 | ↑ | 50% of (b) and (c) was supplied at 75 ± 5° C. on the way and residence time was 30 min |
|  |  |  | phenylmaleimide | 95 |  |  |  |  |

Footnote:
the upward arrow denotes the same as just the above column.

TABLE 5

| Example | Compound (a) kind | amount for use (part) | Vinyl-basedmonomer (b) kind | amount for use (part) | Initiator (c) kind | amount for use (part) | Polymerization apparatus | Polymerization procedure |
|---|---|---|---|---|---|---|---|---|
| 20 | 2-hydroxyethyl disulfide | 153 | methyl methacrylate | 90 | AIBN | 1.6 | KRC kneader | mixture was supplied at one time at 100 ± 5° C. and residence time was |
|  |  |  | 2-perfluoroctylethyl methacrylate | 53 |  |  |  |  |
| 21 | ↑ | ↑ | methyl methacrylate | 60 | ↑ | ↑ | ↑ | ↑ |
|  |  |  | γ-methacryloyloxytrimethyl-silane | 7 |  |  |  |  |
| 22 | ↑ | ↑ | methyl methacrylate | 160 | ↑ | ↑ | ↑ | ↑ |
|  |  |  | acrylic acid | 5 |  |  |  |  |
|  |  |  | 2-hydroxyethyl methacrylate | 13 |  |  |  |  |

Footnote:
the upward arrow denotes the same as just the above column.

TABLE 6

| Example | Polymerization percentage (%)*1 | Polymer | Number-average molecular weight *2 | Fn (OH) *3 | Gel portion percent (%)*4 |
|---|---|---|---|---|---|
| 1 | 96 | [1] | 3600 (2.0) | 2.0 | 95 |
| 2 | 96 | [2] | 3600 (2.0) | 2.0 | 93 |
| 3 | 98 | [3] | 1700 (1.9) | 1.9 | 90 |
| 4 | 93 | [4] | 4800 (2.2) | 1.9 | 90 |
| 5 | 98 | [5] | 5200 (2.1) | 1.8 | 89 |
| 6 | 95 | [6] | 14000 (2.3) | 1.9 | 92 |
| 7 | 96 | [7] | 31000 (2.2) | 1.7 | 86 |
| 8 | 93 | [8] | 58000 (2.6) | 1.7 | 85 |
| 9 | 99 | [9] | 25000 (2.1) | 7.7 | 98 |
| 10 | 95 | [10] | 2000 (2.3) | 2.0 | 96 |
| 11 | 95 | [11] | 8600 (1.9) | 1.6 | 83 |
| 12 | 93 | [12] | 1900 (1.8) | 1.9 | 90 |
| 13 | 90 | [13] | 4000 (2.0) | 2.0 | 92 |
| 14 | 89 | [14] | 4800 (1.8) | 1.9 | 89 |
| 15 | 88 | [15] | 5300 (2.2) | 1.8 | 88 |
| 16 | 90 | [16] | 86000 (2.5) | 1.9 | 92 |

TABLE 7

| Example | Polymerization percentage (%)*1 | Polymer | Number-average molecular weight *2 | Fn (OH) *3 | Gel portion percent (%)*4 |
|---|---|---|---|---|---|
| 17 | 896 | [17] | 16000 (2.1) | 1.9 | 90 |
| 18 | 92 | [18] | 8300 (1.9) | 1.8 | 87 |
| 19 | 90 | [19] | 18000 (1.9) | 1.9 | 90 |
| 20 | 93 | [20] | 6000 (2.0) | 1.9 | 91 |
| 21 | 91 | [21] | 3100 (1.8) | 2.0 | 93 |
| 22 | 91 | [22] | 10000 (2.1) | 6.8 | 99 |
| 23 | 90 | [23] | 28000 (2.3) | 1.6 | 84 |

Footnotes in Tables 6 and 7 are illustrated as follows.
*1: calculated from the nonvolatile portion in the polymerization solution with which the polymerization reaction finished.
*2: determined by VPO in the examples 1, 11, and 23, and by GPC using a working curve made by standard polystyrene in the other examples. However, the numeral value in parentheses shows a ratio ($M_w/M_n$) between the weight average molecular weight ($M_w$) and the number average molecular weight ($M_n$).
*3: The average number of terminal hydroxyl groups (Fn(OH)) was calculated on a basis of the OH value obtained according to JIS-K-1557 and the value of number average molecular weight determined from the above *2.
*4: At first, a mixture of the obtained polymer and Sumidur N-75 (a trifunctional isocyanate compound made by Sumitomo Bayer Urethane Co., Ltd.) was prepared so as to be 1.1 to 1 in a mole ratio of the isocyanate group to the hydroxyl group and then, an about 40% toluene solution of this mixture was prepared, to which a slight amount of dibutyltin dilaurate was added as a catalyst. The thus-prepared reaction mixture was, with well stirring, allowed to react at 80° C. for 3 hours to obtain a polyurethane film. After being dried sufficiently, the film was treated with a Soxhlet extractor for 8 hours by using tetrahydrofuran as a solvent and a weight % of the unextracted, remaining insoluble portion was shown as a gel portion percent.

TABLE 8

| | Example 36 | Comparative example 6 | Comparative example 7 |
|---|---|---|---|
| Polymer | Polymer [12] | copolymer showing 1900 in Mn and 59 in OHV and being composed of 19 (wt %) of butyl acrylate, 65 of methyl methacrylate, 3 of acrylic acid and 13 of 2-hydroxyethyl | polyester diol showing 2000 in Mn and 56 in OHV and being composed of 24 (mole %) of terephthalic acid, 26 os isophthalic acid, 28 of ethylene goycol and 22 of neopentyl |

TABLE 8-continued

|  | Example 36 | Comparative example 6 | Comparative example 7 |
|---|---|---|---|
|  |  | acrylate | glycol |
| Coin scratch | ⊚ | ○ | X |
| Processing at ordinary temperature | 3T | 5T | 3T |
| Boiling water resistance | ○ | ○ | X |
| Corrosion resistance | ○ | ○ | Δ |
| Pencile hardness | 5H | 5H | 3H |

TABLE 9

|  | Example 37 | Comparative example 8 | Comparative example 9 |
|---|---|---|---|
| Polymer | Polymer [17] | copolymer showing 1600 in Mn and 7.1 in OHV and being compsed of 63 (wt. %) of butyl acrylate, 22 of acrylonitrile, 11 of methyl methacrylate, 2.5 of acrylic acid and 1.5 of 2-hydroxyethyl acrylate | polyester showing 10,000 in Mn and 11 in OHV and being composed of 50 (mole %) of adipic acid and 50 of 1,6-hexanediol |
| Adhesive strength at ordinary condition (g/15 mm) | 850 | 710 | 450 |
| Hot water-resistant adhesive strength (g/15 mm) | 860 | 730 | delaminate |
| Chemikal-resistant adhesive strength (g/15 mm) | 840 | 700 | 130 |
| Softness | ○ | X | Δ |
| Wetting property | ○ | ○ | ○ |

TABLE 10

|  | Example 38 | Example 39 | Comparative example 10 |
|---|---|---|---|
| Polymer | Polymer [16] | Polymer [7] | copolymer showing 86000 in Mn and 4.8 in OHV and being composed of 45 (wt %) of 2-ethyl-hexyl acrylate, 45 of butyl acrylate, 5 of vinyl acetate, 4 of acrylic acid and 1 of 2-hydroxyethyl acrylate |
| Tackiness strength (g/25 mm) |  |  |  |
| 23° C. | 480 | 380 | 400 |
| 5° C. | 360 | 260 | 120 |
| Probe tack (minute) |  |  |  |
| 23° C. | 1180 | 1100 | 1020 |
| 5° C. | 680 | 600 | 320 |
| Holding strength (minute) | 180 or more | 180 or more | 180 or more |

TABLE 11

|  | Example 40 | Example 41 | Comparative example 11 | Comparative example 12 | Comparative example 13 |
|---|---|---|---|---|---|
| Polymer | Polymer [13] | Polymer [5] | copolymer showing 4000 in Mn and 28 in OHV and being composed of 94 (wt %) of ethyl acrylate and 6 of 2-hydroxyethyl acrylate | polyester showing 4500 in Mn and 25 in OHV and being composed of 13 (mole %) of terephthalic acid, 37 of adipic acid, 28 of ethyleneglycol and 22 of neopentyl glycol | composed of 90 of polypropylene glycol showing 2,000 in Mn and 56 in OHV with 10 of neopentyl glycol |
| Pollution | ○ | ○ | ○ | ○ | Δ |

TABLE 11-continued

| | Example 40 | Example 41 | Comparative example 11 | Comparative example 12 | Comparative example 13 |
|---|---|---|---|---|---|
| 50% modulas (Kg/cm$^2$) | 2.5 | 2.0 | 1.2 | 1.5 | 0.9 |
| Maxium strength (Kg/cm$^2$) | 13 | 10 | 6 | 9 | 4 |
| Maxium strength (%) | 550 | 620 | 80 | 520 | 780 |
| Weather resistance (stretch-holding percent) (%) | 90 | 88 | 88 | 55 | 38 |

TABLE 12

| | Example 42 | Comparative example 14 | Comparative example 15 | Comparative example 16 |
|---|---|---|---|---|
| Polymer | Polymer [1] | copolymer showing 2000 in Mn and 56 in OHV and being composed of 88 (wt %) of butyl acrylate and 12 of 2-hydroxyethyl acrylate | polyester being composed of 50 (mole % of adipic acid, 25 of ethyleneglycol and 25 of neopentyl glycol | polypropylene glycol showing 1,500 in Mn and 75 in OHV |
| Maximum stretch-resistant strength (Kg/cm$^2$) | 2.4 | 1.8 | 2.0 | 1.2 |
| Stretching (%) | 220 | 150 | 200 | 260 |
| 1% modulas (Kg/cm$^2$) | 1.3 | 0.9 | 1.1 | 0.6 |
| Strength-holding percent (%) | 93 | 90 | 50 | 45 |

TABLE 13

| | Example 45 | Example 46 | Example 47 | Example 48 | Example 49 |
|---|---|---|---|---|---|
| Polymer [43] (part) | 50 | 50 | — | — | — |
| Polymer [44] (part) | — | — | 60 | 40 | 30 |
| Styrene (part) | 50 | 30 | 40 | 60 | 50 |
| Pentaerythritol tetracrylate (part) | — | 20 | — | — | 20 |
| Viscosity (poise) | 16 | 17 | 21 | 17 | 13 |
| Thixotropy | 4.8 | 4.9 | 5.1 | 4.8 | 4.8 |
| Gel time (minute) | 19 | 17 | 15 | 17 | 15 |
| Film-forming performance (cissing) | not occur | not occur | not occur | not occur | not occur |
| Pencile hardness | 5 H | 7 H | 7 H | 6 H | 8 H |
| Weather resistance (gloss-holding percent (%) at 1,000 hours after an accelated sether resistance test | 65 | 73 | 68 | 63 | 60 |

TABLE 14

| | Example 50 | Example 51 | Example 52 | Comparative example 17 | Comparative example 18 |
|---|---|---|---|---|---|
| Polymer | Polyurethane [26] | Polyurethane [31] | Polyester [33] | SBS type thermosetting elastomer composed of styrene/butadiene = 40/60 (wt %) | polyester composed of 38 (mole %) of adipic acid, 12 of terepthalic acid and 50 of ethylene glycol |
| Tensility (20° C., %) | 950 | 1200 | 900 | 760 | 800 |
| Oil resistance (volume-varying percent) (%) | 10 | 12 | 65 | 15 | 12 |
| Weather resistance (stretch-holding percent) (%) | | | | | |
| after 24 hr | 99 | 98 | 97 | 85 | 95 |
| after 330 hr | 95 | 97 | 93 | 20 | 75 |
| Chemical resistance | | | | | |
| 1 day | A | A | A | A | D |
| 14 days | A | A | A | A | C |

TABLE 15

| | Example 53 | Example 54 | Comparative example 19 | Comparative example 20 |
|---|---|---|---|---|
| Polymer | Polyurethane [27] | Polyester [34] | polyester polyurethane Composed of 10 (mole ratio) of polyester diol showing 2,000 in Mn and 56 in OHV with 40 of 1,4-buthanediol and 50 of 4,4'-diphenylmethane diisocyanate, in which the polyester diol was composed of a 1:1 mole ratio of 3-methyl-1,5-pentanediol to adipic acid | polyether polyurethane composed of 10 (mole ratio) of polypropylene glycol (Mn = 2000, OHV = 56), 40 of 1,4-buthanediol and 50 of 4,4'-diphenylmethane diisocyanate |
| Molding processing (apparent activation energy of melt fluidity, Kcal/mol) | 60 | 55 | 120 | 50 |
| Low temperature performance (Ta, °C.) | −50 | −48 | −28 | −36 |
| Hydrolysis resistance (strength-holding percent, %) | 95 | 92 | 70 | 65 |
| Weather resistance (strength-holding percent, %) | 93 | 90 | 62 | 48 |

EXAMPLE 55

Into a flask equipped with a stirrer, nitrogen gas-introducing tube, thermometer and reflux condenser were added 100 parts of the polymer [1] obtained from the example 1 and 10 parts of 1,4-butanediol as well as TDI so as to be in a 1.05 mole ratio of NCO to OH, and then, was charged 0.1 part of dibutyltin dilaurate and the mixture was stirred in a DMF at 80° C. for 5 hours to complete reaction, whereby the polyurethane [55] was obtained.

The number average molecular weight (Mn) of this polyurethane [55] was 39,000 in measuring by a standard polystyrene conversion method using gel permeation chromatography (GPC).

This polyurethane [55] was redissolved in tetrahydrofuran and converted into a film.

Comparative Example 21

The procedure of example 55 was repeated except that a polyester polyol known in public and having a number average molecular weight (Mn) of 2,000 was used instead of the polymer [1], whereby the polyurethane for comparison [21] was obtained.

Comparative Example 22

The procedure of example 55 was repeated except that a polyether polyol known in public and having a number average molecular weight (Mn) of 3,000 was used instead of the polymer [1], whereby the polyurethane for comparison [22] was obtained.

Example 56 and Comparative Examples 23 and 24

For the polyurethane [55] obtained from the example 55 and the polyurethanes for comparison [21] and [22] obtained from the comparative examples 21 and 22 there were carried out the undermentioned evaluation tests about artificial leather and synthetic leather.

(1) Hydrolysis resistance

The polyurethane [55] and [21] were evaluated by a jungle test, which was carried out by leaving a polyurethane film of 50μ thickness at 70° C. for 12 days under a relative humidity of 95%. A tensile strength-holding percentage of the film was derived from results in stress-strain characteristics obtained before and after the jungle test using an Instron testing machine and used for evaluation.

The results were as the under-described.

| Sample | Tensile strength-holding percent |
|---|---|
| Polyurethane [1] | 100% |
| Polyurethane for comparison [21] | 80% |

(2) Heat resistance

Heat resistance of the polyurethane [55] and polyurethane for comparison [22] were evaluated. An urethane film was left at 120° C. for 6 days under drying by a hot wind, and a tensile strength-holding percentage of the film was derived from results in stress-strain characteristics obtained before and after leaving under the drying and used for evaluation.

| Sample | Tensile strength-holding percent |
|---|---|
| Polyurethane [55] | 100% |
| Polyurethane for comparison [22] | the film shape was not held. |

EXAMPLE 57

In a flask equipped with a stirrer, nitrogen gas-introducing tube, thermometer and reflux condenser were mixed 760 parts of the polymer [4] obtained from the example 4 and 66.7 parts of isophorone diisocyanate, and the mixture was allowed to react at 95° C. for 10 hours to obtain an urethane prepolymer of 1.5% free NCO. To this reaction mixture was poured 620 parts of methyl ethyl ketone (MEK) to get a homogeneous solution. Then, into a solution of 23.3 parts of isophoronediamine and 2.4 parts of di-n-butylamine dissolved in a mixed solvent of 226 parts of MEK and 118 parts of isopropanol there was added dropwise 1447 parts of the above-described prepolymer MEK solution at room temperature. After dropping, the mixture was warmed up to 50° C. and allowed to react for 3 hours.

Next, 25 parts of titanium oxide, 37.5 parts of the aforementioned polyurethane solution (polymer concentration was 47%) and 23 parts of MEK (were treated with a ball mill for 24 hours, and to this obtained mixture was added 29 parts of ethyl acetate, whereby a printing ink composition was obtained. Using this ink composition, printing was carried out on a Nylon film and a polyester film using a gravure printing machine and, according to the undermentioned method, printing aptitude (adhesion and antiblocking performance) and durability (hydrolysis resistance and heat-deterioration resistance) were examined. Results obtained are shown in Table 16. This printing ink composition showed no change in viscosity and superiority in dispersion performance, even if it was preserved for a long period of time.

(1) Printing aptitude

Adhesion (Cello-Tape adhesion performance)

A film was left for 1 day after printing, a piece of Cello-Tape was pasted on the printed part, and this tape was quickly peeled off.

Good: not peeled off at all.

Bad: partly peeled off.

Blocking resistance

Two sheets of printed matters were overlapped so as to join the printed faces together, bound tight by a thermal press machine so that the printed faces were tightly adhered, left at 40° C. for 24 hours, and each other peeled off.

Good: peeled off without resistant feeling.

Somewhat good: peeled off with slight resistant feeling

Bad: peeled off with definite resistant feeling, or not peeled off (2) Durability Hydrolysis resistance A printed matter was immersed in water of 100° C. for 72 hours and the adhesive performance of printed parts was examined.

Good: no adhesion

Bad: adhesion exists.

Heat-deterioration resistance

A printed matter was left at 120° C. for one week in a hot wind dryer and the adhesive performance of printed parts was examined.

Good: no adhesion

Bad: adhesion exists.

Comparative Example 25

The procedure of example 57 was repeated, to obtain a printing ink composition for comparison composed of polytetraethylene glycol, except that 300 parts of hitherto-known polytetramethylene glycol of 2,000 in molecular weight (Mn) was used instead of the polymer [4]. Concerning this composition, similar to the case of example 57, the printing aptitude and durability were investigated. Results are shown in Table 16.

Comparative Example 26

The procedure of example 57 was repeated, to obtain a printing ink composition for comparison composed of polytetramethylene glycol, except that 300 parts of hitherto-known polybutylene adipate diol of 2,000 in molecular weight (Mn) and 79 parts of 4,4'-dicyclohexylmethane diisocyanate were used instead of the polymer [4]. Concerning this composition, similar to the case of example 57, the printing aptitude and durability were investigated. Results are shown in Table 16.

TABLE 16

| | Printing aptitude | | Durability | |
|---|---|---|---|---|
| | adhesive | blocking resistance | hydrolysis resistance | heat-deterioration resistance |
| Example 57 | good | good | good | good |
| Comparative example 25 | good | a little good | good | not good |
| Comparative example 26 | good | a little good | not good | good |

EXAMPLE 58

(Example with respect to a thermosetting polyurethane elastomer composition)

The procedure of example 1 was repeated except that 43 parts of methyl acrylate was used instead of 64 parts of butyl acrylate, whereby the polymer [58] of 2,200 in number average molecular weight and 2.0 in Fn(OH) was obtained.

EXAMPLE 59

(Example with respect to a thermosetting polyurethane elastomer composition)

A flask equipped with a stirrer, nitrogen gas-introducing tube and reflux condenser were charged 1200 parts of the aforementioned polymer [58], 51 parts of butanediol and 1397 parts of TDI, and the obtained mixture was allowed to react with stirring at 80° C. for 3 hours under a nitrogen atmosphere.

The obtained reaction product, 1660 parts, was defoamed at 80° C. under a reduced pressure, to which was added 284 parts of 3,3'-dichloro-4,4'-diaminodiphenylmethane melted at 120° C. beforehand, and the mixture was stirred for 1 hour so as not to swallow foam and then, poured into a mold which was heated at 100° C., and harden at 100° C. during 24 hours to obtain the polyurethane elastomer [59].

This polyurethane elastomer [59] was examined in stress-strain characteristics (by an Instron) and durability. The durability was evaluated by the undermentioned hydrolysis resistance and heat resistance. Results are shown in Table 17.

(1) Hydrolysis resistance

This was evaluated by a jungle test, which was carried out by leaving a polyurethane molding at 70° C. under a relative humidity of 95% for 12 days. From the stress-strain characteristic results of before and after the jungle test which were measured by an Instron, the hydrolysis resistance was evaluated by a tensile strength-holding percentage of the molding.

(2) Heat resistance

An urethane film was left for about 6 days with drying by a hot wind of 120° C. and, from the stress-strain characteristic results of before and after leaving for the drying by a hot wind measured by an Instron, the heat resistance was evaluated by a tensile strength-holding percentage of the film.

Comparative Example 27

(Example with respect to a thermosetting polyurethane elastomer composition)

The procedure of example 59 was repeated except that 552 parts of hitherto-known polyester polyol of 1,000 in number average molecular weight (Mn) was used instead of the polymer [58], whereby the polyurethane elastomer for comparison [27] was obtained.

Similar to the example 59, the stress and strain characteristics of this polyurethane elastomer for comparison [27] was examined. Results are shown in Table 17.

Comparative Example 28

(Example with respect to a thermosetting polyurethane elastomer composition)

The procedure of example 59 was repeated except that 552 parts of hitherto-known polyether polyol of 1,000 in number average molecular weight (Mn) was used instead of the polymer [58], whereby the polyurethane elastomer for comparison [28] was obtained.

Similar to the example 59, the stress and strain characteristics of this polyurethane elastomer for comparison [28] was examined. Results are shown in Table 17.

TABLE 17

|  | Stress-strain characteristic | | Durability (tensile strength-holding percent) | |
| --- | --- | --- | --- | --- |
|  | tensile strength kg/cm$^2$ | stretching % | hydrolysis resistance % | heat resistance % |
| Example 59 | 610 | 280 | 100 | 100 |
| Comparative example 27 | 580 | 260 | 75 | 90 |
| Comparative example 28 | 540 | 280 | 85 | 52 |

EXAMPLE 60

(Example with respect to a resin composition for floor material)

Into a flask equipped with a stirrer, nitrogen gas-introducing tube, thermometer and reflux condenser were placed 85 parts of the polymer [1] of example 1 and 18.3 parts of TDI and the obtained mixture was allowed to react with stirring at 80° C. for 3 hours under a nitrogen atmosphere, whereby a polymer [1]/TDI prepolymer was obtained.

Next, using this [1]/TDI prepolymer, the polyurethane composition shown in Table 18 (a resin composition for floor material) was produced, of which hardness, surface tackiness and durability (hydrolysis resistance and heat resistance) were measured and evaluated. These results are shown in Table 19.

Comparative Example 29

(Comparative example with respect to a resin composition for floor material)

Into a flask equipped with a stirrer, nitrogen gas-introducing tube, thermometer and reflux condenser were placed 85 parts of polypropylene glycol of 2,000 in number average molecular weight and 15 parts of TDI and the obtained mixture was allowed to react with stirring at 80° C. for 3 hours under a nitrogen atmosphere, whereby a polypropylene glycol/TDI prepolymer was obtained.

Next, using this polypropylene glycol/TDI prepolymer, the polyurethane composition for comparison shown in Table 18 (a resin composition for floor material was produced, of which hardness, surface tackiness and durability (hydrolysis resistance and heat resistance) were measured and evaluated. These results are shown in Table 19.

Comparative Example 30

Into a flask equipped with a stirrer, nitrogen gas-introducing tube, thermometer and reflux condenser were placed 85 parts of a polyester polyol of 2,000 in number average molecular weight and 15 parts of TDI and the obtained mixture was allowed to react with stirring at 80° C. for 3 hours under a nitrogen atmosphere, whereby a polyester polyol/TDI prepolymer was obtained.

Next, using this polyester polyol/TDI prepolymer, the polyurethane composition for comparison shown in Table 18 (a resin composition for floor material) was produced, of which hardness, surface tackiness and durability (hydrolysis resistance and heat resistance) were measured and evaluated. These results are shown in Table 19.

TABLE 18

|  | Prepolymer (part) | Hardener MOCA (footnote 1) (part) | Hardener polyhydroxy polyol (part) | Plasticizer DOP (part) | Filler heavy calcium carbonate (part) | Color powder carbon/ titanium oxide (part) | Curing catalyst 2-ethyl hexanate (part) + lead octylate (part) |
| --- | --- | --- | --- | --- | --- | --- | --- |
| Example 60 | polymer [1]/TDI 93.3 | 4.4 | polymer [1] 20 | 18 | 50 | 4 | 0.2 + 0.5 |
| Comparative example 29 | polypropylene glycol/TDI 100 | 8 | polypropylene glycol 20 | 18 | 50 | 4 | 0.2 + 0.5 |
| Comparative example 30 | polyester polyol/TDI 100 | 8 | polyester polyol 20 | 18 | 50 | 4 | 0.2 + 0.5 |

Footnote 1: MOCA denotes 3,3'-dichloro-4,4'-diaminodiphenylmethane

TABLE 19

|  | Hardness (footnote 1) | Surface tackiness (footnote 2) | Durability | |
| --- | --- | --- | --- | --- |
|  |  |  | hydrolysis resistance % (footnote 3) | heat resistance % (footnote 4) |
| Example 60 | 43 | ○ | 100 | 100 |
| Comparative example 29 | 36 | ○ | 82 | 45 |
| Comparative example | 39 | ○ | 71 | 89 |

TABLE 19-continued

| | | Durability | |
|---|---|---|---|
| Hardness (footnote 1) | Surface tackiness (footnote 2) | hydrolysis resistance % (footnote 3) | heat resistance % (footnote 4) |
| 30 | | | |

Footnote 1: The hardness (a scale value of after being brought for 5 seconds in contact with a pressured face) was measured by using a spring type hardness meter of JIS A.
Footnote 2: The presence or absence of tackiness on the surface is determined by evaluating functionality. ○: there is not tackiness. X : there is tackiness.
Footnote 3: A polyurethane made by hardening a resin composition for floor material was evaluated by a jungle test. In the jungle test, the polyurethane film was stood at 70° C. for 12 days under a relative humidity of 95% and the hydrolysis resistance was evaluated by the tensile strength-holding percents of a moldings obtained from the stress-strain characteristic results before and after the jungle test by a Instron type machine.
Footnote 4: Heat resistance of a polyurethane obtained by hardening a resin composition for floor material was evaluated. The heat resistance was evaluated by standing an urethane film under drying by a 120° C. hot wind for about 6 days, followed by determining the stretch-holding percentage of the film obtained from the stress-strain characteristic results before and after the standing under drying by the hot wind by a Instron type machine.

EXAMPLE 61

(Synthesis of a polymer having polymerizable unsaturated groups at both terminals)

The procedure of example 43 was repeated except that parts of the polymer [1] was used instead of 100 parts of the polymer [21], whereby the polymer [61] was obtained.

EXAMPLE 62

(Synthesis of a polymer having polymerizable unsaturated groups at both terminals)

The procedure of example 43 was repeated except that parts of the polymer [2] was used instead of 100 parts of the polymer [21], whereby the polymer [62] was obtained.

EXAMPLE 63

Synthesis of a polymer having polymerizable unsaturated groups at both terminals The procedure of example 43 was repeated except that 452 parts of the polymer [6] was used instead of 100 parts of the polymer [21], whereby the polymer [63] was obtained.

EXAMPLE 64

(Synthesis of a polymer having polymerizable unsaturated groups at both terminals)

The procedure of example 43 was repeated except that 65 parts of the polymer [10] was used instead of 100 parts of the polymer [21], whereby the polymer [64] was obtained.

EXAMPLE 65

The polymer [62], 50 parts, obtained from the example 62, 48.5 parts of styrene and 1.5 parts of a silane coupling agent (KBM-503, made by Shinetsu Kagaku Co., Ltd.) were mixed to obtain a resin composition.

Next, 200 parts of aluminum hydroxide (Higilite H-320, average particle diameter 3.5µ, made by Showa Denko Co., Ltd.) was mixed into this resin composition with kneading by a high speed stirrer and, to this mixture, 0.8 parts of Kayaester O (tertiary-butylperoxy-2-ethylhexanoate, made by Kayaku Noury Co., Ltd.) was added as a curing agent with mixing, and the obtained mixture was defoamed under a reduced pressure to obtain a compound. Viscosity of this compound was 7 poise at a liquid temperature of 30° C.

This compound was injected into a casting mold of 1,000×600×6 mm size and, when hardened at 60° C., it was hardened during 30 minutes and, subsequently, after-hardening was carried out at 120° C. for 2 hours.

The obtained hardened product was such as having outside appearance of a marble tone colored to milky white and scattering light beautifully, having fire retardant performance, and being superior in impact resistance and machining.

EXAMPLES 66 TO 69

The procedure of example 65 was repeated to obtain hardened products except that the formulation shown in Table 20 was used. These hardened products scatters beautiful light of milky white, have fire-retardant performance, and are superior in impact resistance and machining.

Comparative Example 31

Into 73 parts of methyl methacrylate was dissolved 27 parts of methyl polymethacrylate (Acrypet MD 011, made by Mitsubishi Rayon Co., Ltd.) and a syrup of methyl methacrylate having 5 poise in viscosity (a resin solution was obtained.

Next, 200 parts of aluminum hydroxide (Higilite H-320, average particle diameter 3.5µ, made by Showa Denko Co., Ltd.) was mixed into this resin composition with kneading by a high speed stirrer and, to this mixture, 0.8 parts of Kayaester O (made by Kayaku Noury Co., Ltd.) was added as a curing agent with mixing, and the obtained mixture was defoamed under a reduced pressure to obtain a resin compound for comparison. Viscosity of this resin compound was 200 poise at a liquid temperature of 30° C.

Because of a lot of residual air foam and bad fluidity, this resin compound was difficult in casting. When this resin compound was injected into a casting mold of 1,000× 600×6 mm size and hardened at 60° C., it was hardened during minutes and, subsequently, after-hardening was carried out at 120° C. for 2 hours.

Properties of the obtained hardened products had a problem in impact resistance as shown in Table 23.

Comparative Example 32

The procedure of example 65 was repeated except that, as shown in Table 22, 20 parts of ethylene glycol dimethacrylate was used instead of 50 parts of the polymer [62] having polymerizable unsaturated group at both terminals, whereby a hardened product was obtained.

Properties of the obtained hardened product were as shown in Table 23 and inferior in impact resistance and processing performance.

Comparative Example 33

A monomer mixture solution was obtained by mixing 30 parts of trimethylolpropane trimethacrylate, 50 parts of styrene, 20 parts of methyl methacrylate and a silane coupling agent (KBM-503, made by Shinetsu Kagaku Co., Ltd.)

Next, 300 parts of aluminum hydroxide (Higilite H-320, average particle diameter 3.5µ, made by Showa Denko Co., Ltd.) was mixed into the above mixture solution with kneading by a high speed stirrer and, to this mixture, 0.5 parts by weight of Kayaester P-70 (tertiary-butylperoxy pivalate, Kayaku Noury Co., Ltd.) was added as a curing agent with mixing, and the obtained mixture was defoamed under a reduced pressure to obtain a compound for comparison. Viscosity of this compound was 10 poise at a liquid temperature of 30° C.

This compound was injected into a casting mold of 1,000×600×6 mm size and, when hardened at 50° C., it was hardened during 45 minutes and, subsequently, after-hardening was carried out at 120° C. for 2 hours.

The obtained hardened product was such as having semitransparency of a marble tone colored to milky white and scattering light beautifully, having fire retardant performance. As shown in Table 23, its heat deformation temperature was so high as 230° C., but its impact resistance and processing performance were inferior.

Comparative Example 34

Into a resin solution prepared by mixing 100 parts of a vinyl ester resin (which is made by dissolving 55 parts of a bisphenol A type epoxy acrylate resin into 45 parts of styrene) with 1.5 parts of a silane coupling agent (KBM-503, made by Shinetsu Kagaku Co., Ltd.), there was mixed with kneading 200 parts of aluminum hydroxide (Higilite H-320, average particle diameter 3.5μ, made by Showa Denko Co., Ltd.) using a high speed stirrer and, to this mixture, 0.8 parts of Kayaester 0 (made by Kayaku Noury Co., Ltd.) was added as a curing agent with mixing, and the obtained mixture was defoamed under a reduced pressure to obtain a resin compound for comparison.

Viscosity of this resin compound was 300 poise at a liquid temperature of 30° C. Because of a lot of residual air foam and bad fluidity, the casting into a mold had difficulty.

This resin compound was injected into a casting mold of 1,000×600×6 mm size and, when hardened at 60° C., it was hardened during 50 minutes and, subsequently, after-hardening was carried out at 110° C. for 2 hours.

As shown in Table 23, the obtained hardened product had problems in impact resistance and processing performance.

TABLE 20

| Formulation (weight part) | Example | | | | |
|---|---|---|---|---|---|
| | 65 | 66 | 67 | 68 | 69 |
| polymer [62] | 50 | 45 | | | |
| polymer [63] | | | 30 | | |
| polymer [64] | | | | 50 | 40 |
| polymer [61] | | 5 | 4 | 5 | 5 |
| styrene | 48.5 | | 25 | 25 | 25 |
| methyl methacrylate | | 43.5 | 36.5 | 13.5 | 23.5 |
| silane coupling agent (KBM-503) | 1.5 | 1.5 | 1.5 | 1.5 | 1.5 |
| ethyleneglycol dimethacrylate | | 5 | | | |
| trimethylolpropane trimethacrylate | | | 3 | | 5 |
| divinylbenzene | | | | 5 | |
| hardener (Kavaester O) (footnote 1) | 0.8 | 0.8 | 0.4 | 0.4 | 0.8 |
| hardener (Kavaester P-70) (footnote 2) | | | | 0.4 | 0.4 |
| aluminium hydroxide | 200 | 200 | 300 | | |
| granite-crushed stone (footnote 3) | | | | 200 | |
| resin-crushed matter (footnote 4) | | | | | 200 |
| Viscosity of composition (poise/30° C.) | 7 | 6 | 20 | 12 | 18 |

Footnote 1: Kayaester O: tertiary-butyl peroxy-2-ethylhexanoate (made by Kayaku Noury Co., Ltd.)
Footnote 2: Kavaester P-70: tertiary-butyl peroxypivalatehexanoate (made by Kayaku Noury Co., Ltd.)
Footnote 3: Granite crushed to particle diameters of from 20 to 80 mesh (the particle diameters are in a range of from about 0.18 to 0.8 mm).
Footnote 4: Such as crushing artificial marble obtained from the example 65 to particle diameters of from 20 to 80 mesh by using a hammer mill.

TABLE 21

| | Example | | | | |
|---|---|---|---|---|---|
| | 65 | 66 | 67 | 68 | 69 |
| Properties of hardened moldings | | | | | |
| heat destortion temperature (°C.) (footnote 1) | 110 | 115 | 112 | | |
| Izod impact strength (kg · cm/cm²) (footnote 2) | 7.0 | 7.8 | 7.3 | 7.3 | 8.0 |
| dropping ball impact height (cm) (footnote 3) | 70 | 80 | 75 | 75 | 85 |
| cutting (breaking of section) (footnote 4) | very little | minimum | minimum | very little | minimum |
| Processing Performance (durability of sword) (footnote 4) | 2000 | 2000 | 1900 | 1800 | 2200 |

Footnote 1: measured according to ASTM * D-648.
Footnote 2: measured according to JIS K-6911 (t: 6 mm, flat wise).
Footnote 3: measured according to JIS M-6718 (t: 6 mm, steel ball 11/2, weight 225 g).
Footnote 4: The cutting and process performance were evaluated by an extent of breaking of a section made by a rotary round saw edge (a running saw, made by Shinkow Kogyo Co., Ltd.) as well as by a continuous cutting length (mm) of a hardened matter having 6 mm thickness and a good section.

TABLE 22

| | Comparative example | | | |
|---|---|---|---|---|
| | 31 | 32 | 33 | 34 |
| Formulation (weight part) | | | | |
| methyl Polymethacrylate (footnote 1) | 27 | | | |
| vinylester resin (footnote 2) | | | | 100 |
| styrene | | 48.5 | 50 | |
| methyl methacrylate | 73 | | 20 | |
| silane coupling agent (KBM-503) | | 1.5 | 1.5 | 1.5 |
| ethyleneglycol dimethacrylate | | 20 | | |
| trimethylolpropane trimethacrylate | | | 30 | |
| hardener (Kavaester O) (footnote 3) | 0.8 | 0.8 | | 0.8 |
| hardener (Kavaester P-70) (footnote 4) | | | 0.5 | |
| aluminium hydroxide | 200 | 200 | 300 | 200 |

TABLE 22-continued

| | Comparative example | | | |
|---|---|---|---|---|
| | 31 | 32 | 33 | 34 |
| Viscosity of composition (poise/30° C.) | 200 | 9 | 10 | 300 |

Footnote 1: Methyl polymethacylate; Acrypet MD011, made by Mitsubishi Rayon Co., Ltd.
Footnote 2: A vinylester resin made by dissolving 55 parts of a bisphenol A type epoxyacrylate resin into 45 parts of styrene.
Footnote 3: Kavaester O; tertiary-butylperoxy 2-ethylhexanoate, made by Kayaku Noury Co., Ltd.
Footnote 4: Kavaester P-70; tertiary-butylperoxy pivalate, made by Kayaku Noury Co., Ltd.

TABLE 23

| | Comparative example | | | |
|---|---|---|---|---|
| | 31 | 32 | 33 | 34 |
| Properties of hardened moldings | | | | |
| heat destortion temperature (°C.) (footnote 1) | 100 105 | 200 | 230 | 105 |
| Izod impact strength (kg · cm/cm$^2$) (footnote 2) | 2.5 | 2.6 | 3.5 | 3.5 |
| dropping ball impact height (cm) (footnote 3) | 25 | 30 | 35 | 35 |
| cutting (breaking of section) (footnote 4) | small | somewhat big | somewhat big | somewhat big |
| processing performance (durability of sword) (footnote 4) | 800 | 700 | 600 | 700 |

Footnote 1: measured according to ASTM *D-648.
Footnote 2: measured according to JIS K-6911 (t: 6 mm, flat wise).
Footnote 3: measured according to JIS K-6718 (t: 6 mm, steel ball 11/2, weight 225 g).
Footnote 4: The cutting and process performance were evaluated by an extent of breaking of a section made by a rotary round saw edge (a running saw, made by Shinkow Kogyo Co., Ltd.) as well as by a continuous cutting length (mm) of a hardened matter having 6 mm thickness and a good section.

EXAMPLE 70

(Synthesis of a polymer having carboxyl groups at both terminals)

Into a flask equipped with a stirrer, reflux condenser and thermometer were charged 100 parts of the polymer [1] obtained from the example 1, 5.5 parts of maleic anhydride and 2.8 parts of triethylamine, and the obtained mixture was stirred at 80° C. for 6 hours, whereby the polymer [70] was obtained.

Properties of the polymer 70] showed 3,800 in number average molecular weight (Mn) by GPC measurement and 2.0 in the terminal carboxyl group number [Fn(COOH)] by titrating by alcoholic potassium hydroxide and the aforementioned number average molecular weight. According these findings, it is considered that the reaction proceeded quantitatively.

EXAMPLE 71

(Synthesis of a polymer having carboxyl groups at both terminals)

Into a flask equipped with a stirrer, reflux condenser and thermometer were charged 100 parts of the polymer [13] obtained from the example 13, 5.0 parts of succinic anhydride and 2.1 parts of sodium acetate, and the obtained mixture was stirred at 80° C. for 6 hours, whereby the polymer [71] was obtained.

Properties of the polymer 71] showed 4,100 in number average molecular weight (Mn) by GPC measurement and 2.0 in the terminal carboxyl group number [Fn(COOH)] by titrating by alcoholic potassium hydroxide and the aforementioned number average molecular weight. According these findings, it is considered that the reaction proceeded quantitatively.

EXAMPLE 72

(Synthesis of a polymer having carboxyl groups at both terminals)

Into a flask equipped with a stirrer, reflux condenser and thermometer were charged 100 parts of the polymer [14] obtained from the example 14, 5.9 parts of phthalic anhydride and 2.0 parts of triethylamine, and the obtained mixture was stirred at 80° C. for 6 hours, whereby the polymer [72] was obtained.

Properties of the polymer [72] showed 5,100 in number average molecular weight (Mn) GPC measurement and 1.9 by in the terminal carboxyl group [Fn(COOH)] by number titrating by alcoholic potassium hydroxide and the aforementioned number average molecular weight. According these findings, it is considered that the reaction proceeded quantitatively.

EXAMPLE 73

(Synthesis of a polymer having carboxyl groups at both terminals and side chain)

Into a flask equipped with a stirrer, reflux condenser and thermometer were charged 100 parts of the polymer [17] obtained from the example 17, 0.7 parts of itaconic anhydride and 0.3 parts of triethylamine, and the obtained mixture was stirred at 90° C. for 6 hours, whereby the polymer [73] was obtained.

Properties of the polymer [73] showed 16,000 in number average molecular weight (Mn) by GPC measurement and 6.0 in the carboxyl group number per one polymer molecule [Fn(COOH)] by titrating by alcoholic potassium hydroxide and the aforementioned number average molecular weight. According these findings, it is considered that the reaction proceeded quantitatively.

EXAMPLE 74

An epoxy resin composition was obtained by mixing the polymer [70], obtained from the example 70, at a proportion shown in Table 24 with an epoxy resin and a curing agent.

Concerning this epoxy resin composition, the adhesive test and heat resistance test were carried out. A cold rolled steel sheet of 1.5 mm thickness (0.5 mm in a T type peeling test) was used as a matter to be adhered and thus, polished by a #100 sand paper and degreased by acetone-washing. The adhesive test was carried out by hardening an adhesive with heating at 150° C. for 1 hour and then, by measuring a tensile-breakage strength and T type peeling strength. The heat resistance test was carried out by leaving a sample of the adhesive test for drying by a hot wind at 120° C. for 6 about days, subjecting the sample to the adhesive test before and after leaving for drying, and determining the strength-holding percentage. Results obtained are shown in Table 24.

EXAMPLE 75

The adhesive test and heat resistance test were carried out by repeating the procedure of example 74 except that the polymer [70] obtained from the example 70 and an epoxy resin were preheated at 150° C. for 3 hours beforehand and then, mixed with a curing agent. Results obtained are shown in Table 24.

Comparative Example 35

The adhesive test was carried out by repeating the procedure of example 74 except that the polymer [70] which is a rubber component was not used.

Comparative Example 36

The adhesive test and heat resistance test were carried out by repeating the procedure of example 74 except that, instead of using the polymer C 70], Hycar CTBN 1300X8 made by Ube Kousan Co., Ltd. was used as a rubber component. Results obtained are shown in Table 24.

Comparative Example 37

The adhesive test and heat resistance test were carried out by repeating the procedure of example 75 except that, instead of using the polymer [70], Hycar CTBN 1300X8 made by Ube Kousan Co., Ltd. was used as a rubber component. Results obtained are shown in Table 24.

TABLE 24

|  |  | Example | | Comparative example | | |
|---|---|---|---|---|---|---|
|  |  | 74 | 75 | 35 | 36 | 37 |
| Epoxy resin (part) | ELA 128 (mede by Sumitomo Kagaku) | 100 | 100 | 100 | 100 | 100 |
| Rubber component (part) |  | 20 | 20 | 0 | 20 | 20 |
| Hardener (part) | dicyandiamide+2-methylimidazole | 12 0.6 | 12 0.6 | 10 0.5 | 12 0.6 | 12 0.6 |
| Adhesive strength |  |  |  |  |  |  |
| tensile cutting strength | Kg/cm$^2$ | 242 | 253 | 88 | 206 | 253 |
| T type Peeling strength | Kg/25 mm$^2$ | 5.8 | 7.8 | 0.7 | 5.1 | 7.4 |
| Heat resistance |  |  |  |  |  |  |
| tensile cutting strength-holding percent | % | 100 | 100 | — | 70 | 76 |
| T type peeling strength-holding percent | % | 100 | 100 | — | 53 | 48 |

INDUSTRIAL APPLICATION

In the process for producing a polymer having hydroxyl groups at both terminals relating to the present invention, when a polymerization reaction of a vinyl-based monomer (b) is carried out by using a radical polymerization initiator (c), since the compound (a) is arranged so as to exist always in an amount of 50 mole times or more of the radical polymerization initiator (c) in a reaction vessel and any compound other than these (a), (b) and (c) is not practically used, the hydroxyl groups are easily introduced into both the terminals of a polymer and, as the result, it becomes possible that the polymer having hydroxyl groups at both terminals is easily obtained with cheap price and excellent efficiency from a wide field of vinyl-based monomers including polar vinyl-based monomers.

A polymer having hydroxyl groups at both terminals obtained from this production process, because of the presence of hydroxyl groups at both terminals, it is in itself used as raw materials for various kinds of resins such as a polyester resin, polyurethane resin, polycarbonate resin and the like, and for various kinds of block polymers, coating, elastic wall material, waterproof for paint film, floor material, a pressure-sensitive adhesive (a tackiness agent), tackifier, an adhesive, a binder, sealing compound, urethane foam (hard, semihard, and soft type), urethane RIM, UV. EB curing resin, high solid coating, a thermosetting type elastomer, thermoplastic elastomer,-microcellular, artificial leather, synthetic leather, elastic fiber, a fiber-processing agent, plasticizer, sound absorption material, vibration-controlling material, a surfactant, gel court agent, resin for artificial marble, an impact-resistant agent for artificial marble, a resin for ink, film (a laminate adhesive and protective film, etc.), a resin for laminated glass, reactive diluent and so forth, and also, useful as various kinds of resin additives and these raw materials. Furthermore, it is possible, by carrying out a suitable reaction on the hydroxyl groups at both terminals, to convert easily into a polymer having a functional group other than the hydroxyl group (for example, a polymerizable unsaturated group such as a vinyl group, an amino group, a carboxyl group, an ethynyl group, epoxy group, a silanol group, an alkoxysilyl group, a hydrosilyl group, mercapto group, an oxazoline group, a maleimide group, an azlactone group, a lactone group, bromine, chlorine and the like). The polymer is also very useful. For example, a polymer having carboxyl groups at both terminals is very useful as an impact resistance-affording agent for epoxy adhesives. Also, if a plural ethylene oxide or propylene oxide is added to the terminal hydroxyl groups of a polymer having hydroxyl groups at both terminals, a raw material for a surfactant and so forth is obtained.

A composition of this invention containing a polymer having hydroxyl groups at both terminals, obtained from the production process of this invention, and a polyfunctional compound (d) having two or more of a functional group capable of reacting with a hydroxyl group per one molecule as essential components; when it is used as raw materials for various kinds of resins such as a polyester resin, polyurethane resin, polycarbonate resin and the like, and for various kinds of block polymers, coating, elastic wall material, waterproof for paint film, a pressure-sensitive adhesive, floor material, tackifier, adhesive, binders (a magnetic recording medium, an ink binder, a casting binder, burned brick binder, graft material, microcapsule, glass fiber sizing and the like), sealing compound, urethane foam (hard, semihard, and soft type), urethane RIM, high solid coating, thermosetting type elastomer, thermoplastic type elastomer, microcellular, artificial leather, synthetic leather, elastic fiber, a fiber-processing agent, plasticizer, sound absorption material, vibration-controlling material, artificial marble, a resin for ink, film (a laminate adhesive and protective film, etc.), reactive diluent and so forth, and also, when it is used as various kinds of resin additives and these raw materials, not only it has soft and tough mechanical properties, but also it displays excellence sufficiently in properties such as transparency, weather resistance, water resistance, hydrolysis resistance, chemical resistance and so forth depending upon kinds of the monomer component (b) constructing the main chain of a polymer having hydroxyl groups at terminals.

For example, using a polymer having hydroxyl groups at both terminals having a low molecular weight of from about 1,000 to 10,000 in the weight-average molecular weight, and in a case where the polymer is coated on a base material by combining with a two-functional isocyanate compound and the like, then, subjected to a chain-elongation and used as a pressure-sensitive adhesive, compared with a case where a conventional polymer obtained by copolymerizing a vinyl-based monomer having a functional group is used (there is commonly used such as having a weight-average molecular weight of 100,000 or more), the viscosity of a pressure-sensitive adhesive composition is low, and therefore, there is obtained a pressure-sensitive adhesive composition having an epochmaking effect such as decreasing an using amount of a solvent and improving working efficiency which any conventional pressure-sensitive adhesive composition has not yet.

In the case where the composition of this invention is used as an adhesive composition, because this composition contains a polymer having hydroxyl groups at both terminals obtained from the production process of this invention as one of the essential components, compared with a case where an acrylic-based polymer obtained by copolymerizing a vinyl-based monomer having a functional group is used, viscosity of the adhesive composition is low in a case of exhibiting a similar adhesive performance and, thereby, there are obtained effects such as decreasing an using amount of a solvent and improving working efficiency which any conventional adhesive composition has not yet. Also, an adhesive in which a composition of this invention was used is not only superior in heat resistance in comparison with an adhesive in which a polyether polyol of present use is employed, but also superior in hydrolysis resistance compared with an adhesive in which a polyester polyol of present use is employed.

In the case where the composition of this invention is used as either or both of an artificial leather composition and a synthetic leather composition, because the polymer having hydroxyl groups at both terminals is used by combining with an isocyanate compound hitherto-known in public and the like, there are obtained effects on hydrolysis resistance, heat resistance and weather resistance which have not seen in either or both of a conventional artificial leather composition and a synthetic leather composition. Also, either or both of the artificial leather composition and synthetic leather composition in which the composition of this invention was used are superior in heat resistance compared with either or both of the artificial leather composition and synthetic leather composition in which polyether polyols of present use are employed, as well as they are superior in hydrolysis resistance compared with either or both of the artificial leather composition and synthetic leather composition in which polyester polyols of present use are employed.

In the case where the composition of this invention is used as a thermosetting polyurethane elastomer composition, because the polymer having hydroxyl groups at both terminals is used by combining with an isocyanate compound hitherto-known in public and the like, there are obtained effects on hydrolysis resistance, heat resistance and light-deterioration resistance which have not seen in any conventional thermosetting polyurethane elastomer composition. Also, the thermosetting polyurethane elastomer composition in which the composition of this invention was used is superior in heat resistance compared with the thermosetting polyurethane elastomer composition in which polyether polyols of present use are employed, and superior in hydrolysis resistance compared with the thermosetting polyurethane elastomer composition in which polyester polyols of present use are employed, as well as it is superior in light-deterioration resistance compared with the thermosetting polyurethane elastomer composition in which polycarbonate polyols of present use are employed.

In the case where the composition of this invention is used as a resin composition for floor material, because the polymer having hydroxyl groups at both terminals is used by combining with an isocyanate compound hitherto-known in public and the like, there are obtained effects on hydrolysis resistance, heat resistance and light-deterioration resistance which have not seen in any conventional resin composition for floor material. Also, the resin composition in which the composition of this invention was used is superior in heat resistance compared with the resin composition in which polyether polyols of present use are employed, and superior in hydrolysis resistance compared with the resin composition for floor material in which polyester polyols of present use are employed, as well as it is superior in light-deterioration resistance compared with the resin composition in which polycarbonate polyols of present use are employed.

In the case where the composition of this invention is used as a composition for printing ink, because the polymer having hydroxyl groups at both terminals is used by combining with an isocyanate compound hitherto-known in public and the like, there are obtained effects on hydrolysis resistance, heat resistance and weather resistance which have not seen in any conventional composition for printing ink. Also, the composition for printing ink in which the composition of this invention was used is superior in heat resistance compared with the composition in which polyether polyols of present use are employed, and superior in hydrolysis resistance compared with the composition for printing ink in which polyester polyols of present use are employed.

In the case where the composition of this invention is used as an urethane foam, because the polymer having hydroxyl groups at both terminals is used by combining with an isocyanate compound hitherto-known in public and the like, there are obtained effects on softness, weather resistance, heat resistance, water resistance, chemical resistance and impact resilience percentage which have not seen in any conventional urethane foam composition. Also, the urethane foam in which the composition of this invention was used is superior in heat resistance compared with the urethane foam in which polyether polyols of present use are employed, and superior in hydrolysis resistance compared with the urethane foam in which polyester polyols of present use are employed. The acrylic polyols, commercially available at present and having effects by that their main chains are an acrylic ester, can not produce a thermoplastic polyurethane which is essential for artificial leather and synthetic leather, because they are made by copolymerizing with hydroxyethyl acrylate and, therefore, a polymer containing three or more of a hydroxyl group per one molecule exists.

In the case where the composition of this invention is used as a sealing compound, because the polymer having hydroxyl groups at both terminals is used by combining with an isocyanate compound hitherto-known in public and the like, the obtained sealing compound is soft and tough and there are obtained effects on weather resistance, heat resistance, water resistance, chemical resistance and impact resilience percentage which have not seen in any conventional sealing compound composition. Also, the sealing compound in which the composition of this invention was used is superior in heat resistance compared with the sealing compound in which polyether polyols of present use are employed.

When a composition containing a vinyl-based monomer having one polymerizable unsaturated group per one molecule, in addition to the polymer having polymerizable unsaturated groups at both terminals obtained from a reaction of the aforementioned polymer having hydroxyl groups at both terminals with the compound (h) having two kinds of reactive groups in one molecule, that are a functional group capable of reacting with a hydroxyl group and a polymerizable unsaturated group, is used for a gel court resin composition, resin composition for artificial marble, resin composition for laminated glass and so forth, there is obtained a resin which shows small reaction contraction in molding, low viscosity at working, excellent working efficiency, high hardness in a hardened matter, toughness and excellent weather resistance.

The artificial marble obtained from a resin composition of this invention is superior in heat resistance and weather resistance and also, because contraction resulting from polymerization in molding is small because of using the polymer having polymerizable unsaturated group at both terminals, a problem such as occurrence of cracking in the course of molding is solved. Also, because the polymer having polymerizable unsaturated group at both terminals is put into a crosslinking structure at the polymer terminals, the elasticity of moldings is greatly elevated by using a rubber ingredient for the polymer main chain, and there can be obtained moldings very superior in impact resistance. Further, by the same reason, the molding shows no breakage in the course of processing such as cutting and shaving, and excellent in the cutting and shaving performance.

Further, the polymerization contraction in the course of polymerization is suppressed and flexibility is given to the molding and, therefore, different from a case where a thermoplastic polymer not having a polymerizable unsaturated group is added as carried out conventionally, the polymer having polymerizable unsaturated groups at both terminals is put into a crosslinked structure even after molding, because the adding polymer has the polymerizable unsaturated groups at both terminals. Accordingly, even if the adding amount increases, there does not occur a problem of decrease in heat resistance, and the flexibility is sufficiently given.

The polyurethane of this invention obtained from a reaction of the polyol component (1) containing the polymer having hydroxyl groups at both terminals as an essential component with the polyfunctional isocyanate compound (e) as well as the polyester obtained from a reaction of the polyol component (1) containing the polymer having hydroxyl groups at both terminals as an essential component with the compound (g) having two or more of a carboxyl group per one molecule: in using them as a thermoplastic elastomer and molding material, the above polyurethane and polyester not only have soft and tough mechanical properties, hut also display very excel lent properties such as transparency, weather resistance, water resistance, hydrolysis resistance, oil resistance, chemical resistance and so forth depending upon a sort of the vinyl-based monomer component (b) constituting main chain of the polymer having hydroxyl groups at both terminals and thus, they are very useful with the excellent properties.

The polymer having carboxyl groups at both terminals relating to the present invention, by choosing optionally a sort of the vinyl-based monomer (b) constituting main chain of the polymer, has transparency, weather resistance, water resistance, hydrolysis resistance and chemical resistance, which is similar to the polymer having hydroxyl groups at both terminals, and also, various kinds of resins such as a polyester derived from the polymer having carboxyl groups at both terminals and the like display excellent properties such as high stretching performance (excellent in bending processing) and toughness. Accordingly, the resins are useful as raw material for coating, tacky and non-tacky adhesive, thermoplastic elastomer, various molding materials, a resin modifier (an agent to afford impact resistance), vibration-controlling material, an elastic wall material, a floor material, fiber-processing material, an UV.EB curing resin and the like. Furthermore, a composition containing the polymer having carboxyl groups at both terminals is characterized in that it can be used as a hardening agent and an additive for an epoxy resin and the like, although a polymer having a hydroxyl group terminal can not be used as such the agent and additive. Next, the resin composition characterized by containing the polymer having carboxyl groups at both terminals and the compound (k) having two or more of a functional group capable of reacting with the carboxyl group as essential components, by choosing optionally a sort of the vinyl-based monomer (b) constituting main chain of the polymer, has transparency, weather resistance, water resistance, hydrolysis resistance and chemical resistance, which is similar to the polymer having hydroxyl groups at both terminals, and also, various kinds of resins such as a polyester derived from the polymer having carboxyl groups at both terminals and the like display excellent properties such as high stretching performance (excellent in bending processing) and toughness. Accordingly, the resins are useful as raw material for coating, tacky and non-tacky adhesive, thermoplastic elastomer, various molding materials, a resin modifier (an agent to afford impact resistance), vibration-controlling material, an elastic wall material, a floor material, fiber-processing material, an UV.EB curing resin and the like. Furthermore, a composition containing the polymer having carboxyl groups at both terminals is characterized in that it can be used as an epoxy resin composition, with which it is difficult to use a polymer having hydroxyl groups at terminals.

In the epoxy resin composition characterized by containing the polymer having carboxyl groups at both terminals as an essential component, the toughness is improved by adding the polymer having carboxyl groups at both terminals into an epoxy resin as a rubber ingredient as well as an effect which is not in a conventional epoxy resin composition is obtained on heat resistance and weather resistance. After all, the epoxy resin composition, in which the polymer having carboxyl groups at both terminals of the present invention is used, is superior in heat resistance and weather resistance, when compared with an epoxy resin composition of present use to which a polybutadiene polyol or a polybutadiene-acrylonitrile polyol copolymer is added.

We claim:

1. A process for producing a polymer having hydroxyl groups at both terminals which comprises polymerizing a reaction mixture consisting essentially of a vinyl monomer, a compound of the formula $$HO-A-(S)_x-B-OH$$

wherein A and B are divalent organic groups and X is an integer of from 2 to 5, and a radical polymerization initiator, said compound being in at least a 50 mole excess with respect to the radical polymerization initiator and in a weight ratio of at least 0.5 with respect to the vinyl monomer in the reaction mixture.

2. A process for producing a polymer having hydroxyl groups at both terminals according to claim 1, wherein the vinyl monomer is at least one monomer selected from the group consisting of (meth)acrylic acid, aromatic vinyl, fluorine-containing vinyl and silicon-containing vinyl monomers.

3. A process for producing a polymer having hydroxyl groups at both terminals according to claim 1, wherein at least a part of said compound is added before adding the vinyl monomer and the radical polymerization initiator to the reaction mixture.

4. A process for producing a polymer having hydroxyl groups at both terminals which comprises polymerizing in a reactor a reaction mixture consisting essentially of a vinyl monomer, a compound of the formula $$HO-A-(S)_x-B-OH$$

wherein A and B are divalent organic groups and X is an integer of from 2 to 5, and a radical polymerization initiator, said compound being in at least a 50 mole excess with respect to the radical polymerization initiator and in a weight ratio of at least 0.5 with respect to the vinyl monomer in the reactor.

5. A process for producing a polymer having hydroxyl groups at both terminals according to claim 4, wherein the vinyl monomer is at least one monomer selected from the group consisting of (meth)acrylic acid, aromatic vinyl, fluorine-containing vinyl, and silicon-containing vinyl monomers.

6. A process for producing a polymer having hydroxyl groups at both terminals according to claim 4, wherein the polymerization reaction is carried out by charging at least a part of said compound to the reactor before adding the vinyl monomer and the radical polymerization initiator to the reactor.

* * * * *